(12) United States Patent
Franzen

(10) Patent No.: US 7,315,331 B2
(45) Date of Patent: Jan. 1, 2008

(54) METHOD AND DEVICE FOR CONVERTING VIDEO SIGNALS

(75) Inventor: Ortwin Ludger Franzen, Padersorn (DE)

(73) Assignee: MICRONAS GmbH, Freiburg (DE)

( * ) Notice: Subject to any disclaimer, the term of this patent is extended or adjusted under 35 U.S.C. 154(b) by 436 days.

(21) Appl. No.: 10/250,704

(22) PCT Filed: Jan. 8, 2002

(86) PCT No.: PCT/EP02/00104

§ 371 (c)(1),
(2), (4) Date: Feb. 5, 2004

(87) PCT Pub. No.: WO02/058385

PCT Pub. Date: Jul. 25, 2002

(65) Prior Publication Data

US 2004/0119887 A1    Jun. 24, 2004

(30) Foreign Application Priority Data

Jan. 9, 2001    (DE) .............................. 101 00 677

(51) Int. Cl.
*H04N 7/01* (2006.01)
(52) U.S. Cl. ...................... 348/452; 348/441
(58) Field of Classification Search ............... 348/452, 348/441, 446, 448, 451, 458, 459; *H04N 7/01, H04N 11/20*
See application file for complete search history.

(56) References Cited

U.S. PATENT DOCUMENTS 6,181,382 B1 *  1/2001  Kieu et al. .................. 348/459

FOREIGN PATENT DOCUMENTS

| DE | 1 905 758 | 9/1969 |
|----|-----------|--------|
| DE | 44 14 173 | 6/1995 |
| EP | 0 727 904 | 8/1996 |

OTHER PUBLICATIONS

Martin Botteck, "Mehrdimensionale Interpolationstechniken für eine verbesserte Wiedergabe von Videosignalen" ["Multidimensional Interpolation Techniques for Improved Reproduction of Video Signals"] Disserration, Dortmund University, Shaker Verlag, 1993.

(Continued)

*Primary Examiner*—Sherrie Hsia
(74) *Attorney, Agent, or Firm*—O'Shea, Getz & Kosakowski, P.C.

(57) ABSTRACT

A method for the motion-vector-based conversion of a first video signal which contains a first image sequence at a first frequency to a second video signal which contains a second image sequence at a second frequency, where at least some of the images of the second image sequence which are phase-shifted relative to the images of the first image sequence are generated by an interpolation of the images of the first image sequence such that, for a pixel of an image from the second image sequence, pixels at least from one first image and from one second image of the first image sequence are filtered by a median filter, where the median filter is an adaptively weighted median filter.

16 Claims, 17 Drawing Sheets

OTHER PUBLICATIONS

Schröder et al., "Mehrdimensionale Signalverarbeitung, Band 2: Architekturen und Anwendungen für Bilder und Bildsequenzen" ["Multidimensional Signal Processing, vol. 2: Architecture and Applications for Images and Sequences"], Teubner Verlag, Stuttgart, 2000.

de Haan et al. "An Evolutionary Architecture for Motion-Compensated 100 Hz Television", IEEE Transactions on Circuits and Systems for Video Technology, vol. 5, No. 3, pp. 207-217, Jun. 1995.

Ohm et al. "Low-Cost-System für universelle Video-Formatkonversion",ITG Fachtagung, 7. Dortmunder Fernsehseminar, pp. 251-257, 1997.

Schu et al. "System on Silicon-IC for Motion Compensated Scan Rate Conversion, Picture-In-Picture Processing, Split Screen Applications and Display Processing". IEEE Transactions on Consumer Electronics, vol. 45, No. 3, pp. 842-850, 1999.

Helmut Schönfelder "Digitale Filter in der Videotechnik", Dreo-R-verlag, Berlin, 1988, pp. 125-127.

Rosenfeld et al. "Digital Picture Processing", Academic Press, Inc., $2^{nd}$ Edition, vol. 1, 1982, pp. 261-263.

Blume H., "New algorithm for nonlinear vector-based upconversion with center weighted medians", Journal of Electronic Imaging, Jul. 1997, pp. 368-378.

Franzen et al., "Intermediate Image Interpolation Using Polyphase Weighted Median Filters", SPIE-Int. Soc. Opt. Eng., Jan. 2001, pp. 306-317.

* cited by examiner

METHOD AND DEVICE FOR CONVERTING VIDEO SIGNALS

BACKGROUND OF THE INVENTION

The invention relates in general to the field of digital video signal processing and in particular to a method and a device for converting video signals of one standard into another.

To achieve an acceptable display of video signals in an image, an image format that is adapted in terms of the temporal or spatial sampling raster to the display used to reproduce the image or to the basic multimedia environment is oftentimes required. To this end, it is often necessary to perform a temporal and/or spatial conversion between different video formats. The temporal conversion may comprise the generation of images with a video frequency that deviates from the video frequency of an original video signal to be converted. The spatial conversion may include the generation of image information of the interlaced lines of a field to generate a frame.

In the development of interpolation methods for moving image or video sequences, it is desired to achieve a fluid display of motion and the avoidance of interpolation artifacts or resolution losses.

Prior art exists involving methods and equipment for converting video signals. More specifically, a multiplicity of algorithms exist that provide temporal and/or spatial conversion which may be classified as either motion-adaptive or motion-vector-based methods. In each case, either linear or nonlinear interpolation techniques may be employed.

A number of static or linear methods of format conversion also exist. However, these typically suffer from loss of resolution or blurring of motion. A relatively simple technique for temporal format conversion comprises an image repetition which produces an unsatisfactory reproduction of motion having multiple contours or "jerky" motion sequences due to the temporally incorrect rendition of motion. Linear temporal low-pass filtering results in blurring of motion, and is thus similarly ill-suited for the interpolation of moving regions.

Static linear methods exist which are based on vertical or temporal filtering and are used to achieve a spatial conversion of an interlaced signal (a signal by which sequential interlaced fields are transmitted) to a progressive video signal (a signal that contains frames). This type of conversion is known as proscan conversion.

Since vertical low-pass filtering results in loss of resolution in the vertical axis, while temporal low-pass filtering causes motion blurring in moving image regions, methods have been developed that adaptively cross-fade between temporal filtering in nonmoving image regions and vertical filtering in moving image regions.

Due to the disadvantages of linear interpolation techniques, methods have been developed that employ nonlinear median filters for interpolation. Median filtering sorts input values of the filter by size and selects the value located at the center of the sorted sequence, the sequence usually consisting of values of an odd number.

A known method for proscan conversion is based on a linear vertical band separation of the video signal into a highs channel and a lows channel, and on the use of complementary median filters in the highs channel and the lows channel. The principle on which use of a spatial band separation is based is the fact that human perception may be described by a two-channel model. In the model, there exists a lows channel with a low spatial but high temporal resolution, and a highs channel with a low temporal but high spatial resolution. A known spatial conversion method of this type utilizes band separation in which a missing intermediate line is generated in a field, the method being illustrated in FIG. 1. FIG. 1 illustrates three sequential fields $A_1$, $B_1$, $A_2$ after band separation into a lows channel and a highs channel, where two sequential fields $A_1$ and $B_1$, or $B_1$ and $A_2$, have mutually shifted image rasters. The lines for which the particular image information is transmitted are identified by boxes. According to the known method, the image information of a pixel (x, y), which lies in an intermediate line, is generated in a field $B_1$ of the lows channel, i.e., in the field at time $T_n$ by median filtering from the adjacent pixels in the vertical axis (x, y−1) and (x, y+1) of the same field, and from the pixel at position (x, y) in the following field $A_2$, i.e., the field at time Tn+1. If P represents the image information of the given pixel (x, y, $T_n$), then the following equation applies for the image information of the pixel (x, y) in the field $B_1$ of the lows channel:

$$P(x, y, T_n) = Med \begin{Bmatrix} P(x, y-1, T_n) \\ P(x, y+1, T_n) \\ P(x, y, T_{n+1}) \end{Bmatrix} \quad (1)$$

where Med represents median filtering.

In analogous fashion, the image information of the pixel (x, y) in the intermediate line of field $B_1$ in the highs channel is generated by:

$$P(x, y, T_n) = Med \begin{Bmatrix} P(x, y-1, T_n) \\ P(x, y+1, T_n) \\ P(x, y, T_{n+1}) \end{Bmatrix} \quad (2)$$

Thus, for the interpolation of the image information of the pixel (x, y) in the lows channel, image information of pixels from two fields is processed, namely, from fields $B_1$ and $A_2$ in FIG. 1. On the other hand, image information of pixels from three fields, namely, from fields $A_1$, $B_1$ and $A_2$, is used for the interpolation of the image information of the pixel (x, y) in the highs channel which essentially contains the image details.

The filtering for the lows channel is vertically dominant (intrafield-dominant), since two of the three pixels involved are oriented vertically above each other in the same field of the image. The filtering for the highs channel is temporally dominant (interfield-dominant) or raster-dominant since the three pixels involved in filtering derive from three temporally successive fields.

The vertically dominant median filter in the lows channel enables a relatively good rendition of motion, for example, in horizontally moving vertical edges. It results, however, in resolution losses in vertically high-frequency (rapidly changing) image regions which are of secondary importance in the lows channel. The raster-dominant median filter used in the highs channel, on the other hand, has the high vertical resolution required in the highs channel, but results in a poor rendition of motion in this channel. Additional methods based on modified or edge-direction-oriented median filters are known.

The method described with subband-based signal processing for spatial conversion, i.e., the generation of intermediate lines, has been extended to a temporal up-conversion from 50 Hz interlaced signals to 100 Hz interlaced signals, i.e., to a conversion method in which fields with a 100 Hz image sequence are generated from fields with an image sequence of 50 Hz. The resulting interpolation scheme of the lows channel for the interpolation of an intermediate field β that lies temporally exactly between two original fields A and B is illustrated in FIG. 2. This static interpolation scheme enables a positionally correct interpolation of moving edges or other large objects within a certain velocity range. The basis for this is the edge shift property of median filters.

A 5-tap median filter used in the highs channel for intermediate image interpolation is illustrated in FIG. 3. It is evident here that, unlike the lows channel, no pixels re-interpolated in the raster are supplied to the median filter so as to preclude any vertical resolution loss that is critical in the highs channel. Every other field of the input sequence is taken over directly as the field for the output image sequence.

Even using the above-described error-tolerant interpolation concept, static interpolation methods typically only permit a correct display of motion in the intermediate image to be achieved up to a certain velocity range which is a function of the interpolation mask size. In addition, loss of resolution may occur for moving image information in the highs channel even with raster-dominant median filters.

For these reasons, methods employing a motion-vector-based interpolation have been developed for the relatively high-quality interpolation of moving image sequences. In these methods, a motion vector $(v_x, v_y)$ is assigned to each pixel using an appropriate motion estimation method. The vector indicates by how many raster positions in the x-axis and y-axis a given pixel has moved from one image/field to the next image/field. Various motion estimation methods are known for assigning a motion vector to a pixel or group of pixels.

By incorporating this type of motion vector in the interpolation, or by motion-vector-based addressing of the interpolation filters, as FIG. 4 illustrates, a correct interpolation may be performed even in rapidly moving image regions, assuming an error-free estimation of motion and a purely translational motion.

With reference to FIG. 4, the basic concept of motion-vector-based interpolation is to determine a motion vector $V_{AnBn}$ from positions of a moving pixel in successive images/fields $A_n(T_{-10ms})$ and $B_n(T_{+10ms})$, which vector indicates by how many raster points the pixel has moved, and to interpolate pixels which lie on the path of the motion vector between the positions in the images/fields $A_n(T_{+10ms})$ and $B_n(T_{+10ms})$ based on the image information about the moving pixel and the motion vector in one or more intermediate images which lie temporally between the successive images/fields $A_n(T_{-10ms})$ and $B_n(T_{+10ms})$. As is the case for static and motion-adaptive interpolation, both linear and nonlinear methods exist for motion-vector-based interpolation.

Assuming that the positions of the moving pixel, i.e., the starting point and end point of the motion vector in the images/fields $A_n(T_{-10ms})$ and $B_n(T_{+10ms})$, and thus the motion vector, are precisely known, it is sufficient in a simple linear method to perform a simple shift or a linear averaging. A subband-based interpolation method is known which performs averaging in the lows channel between the two pixels addressed by the starting point and end point of the motion vector. For the image information of a pixel (x, y) in an intermediate image $\beta_n$, the following equation applies:

$$P_\beta(x,y,T_0)=1/2[A_n(x-v_x/2,y-v_y/2,T_{-10ms})+B_n(x+v_x/2,y+Vy/2,T_{+10ms})] \quad (3)$$

where $A_n(x-v_x/2, y-v_y/2, T_{10ms})$ denotes the image information of the pixel in the field sequence $A_n$ at time $T_{10ms}$ which represents the starting point of the motion vector, and where $B_n(x+v_x/2, y+V_y/2, T_{+10ms})$ denotes the image information of the pixel in the field sequence $B_n$ at time $T_{+10ms}$ which represents the end point of the motion vector. The terms $v_x$ and $v_y$ are the components of the estimated motion vector $V_{AnBn}$ for the pixel $(x-v_x/2, y-v_y/2)$ in the field $A_n(T_{-10ms})$.

The image information for the intermediate image is determined in the highs channel by a vector-based shift. For the image information of the pixel (x, y) in an intermediate image $\beta_n$, the applicable equation is:

$$P_\beta(x,y,T_0)=A_n(x-v_x/2,y-v_y/2,T_{-10ms}) \quad (4)$$

or $$P_\beta(x,y,T_0)=B_n(x+v_x/2,y+v_y/2,T_{+10ms}). \quad (5)$$

This method has a poor error tolerance, however, in the case of faulty, i.e., incorrectly estimated, motion vectors.

For this reason, a nonlinear interpolation method is known based on a 3-tap median filter. Here, the image information for a pixel (x, y) of an intermediate image β interpolated according to FIG. 4 is determined by median filtering of image information for the starting point and end point of the motion vector, and of a mean of the image information from the starting point and end point as follows:

$$P_\beta(x, y, T_n) = Med\begin{Bmatrix} A_n(x - v_x/2, y - v_y/2, T_{-10ms}) \\ 1/2[A_n(x, y, T_{-10ms}) + B_n(x, y, T_{+10ms})] \\ B_n(x + v_x/2, y + v_y/2, T_{+10ms}) \end{Bmatrix} \quad (6)$$

In the case of a correctly estimated vector, the pixels selected in image $A_n$ and image $B_n$ based on the motion vector—the starting points and end points of the motion vector—are identical, and thus form the initial value of the median filter. In the case of faulty estimation of motion, i.e., when the starting points and end points of the motion vector do not contain the same image information, linear averaging results as a fall-back mode, along with the resulting blurring of motion.

The vector-based intermediate image interpolation methods described so far do not have sufficient tolerance for faulty estimations for the motion vector, i.e., for vector errors. An improvement in the image quality of interpolated images is possible by using weighted vector-based median filters. Therein, a spatial band separation is performed.

An interpolation scheme for the lows channel is illustrated in FIG. 5. A median filter is supplied with image information from multiple pixels which are located around the starting pixel of the motion vector $V_{AnBn}$ in the field $A_n(T_{-10ms})$ and around the end pixel of the motion vector $V_{AnBn}$ in the field $B_n(T_{+10ms})$. The median filter is also supplied with image information, in the form of recursive elements, for already determined adjacent pixels of the intermediate image $\beta_n$. For purposes of illustration, the median filter in FIG. 5 is supplied with image information from nine pixels of field $A_n$ $(T_{-10ms})$, nine pixels of field $B_n(T_{+10ms})$, and three pixels of intermediate image $\beta_n(T_0)$. The image information supplied to the median filter may be variously weighted, the weighting factor indicating how often the image information of a pixel is supplied to the median filter.

The pixels of the lows channel to be interpolated are calculated as follows:

$$P_\beta(x, y, T_\beta) = Med \begin{Bmatrix} W_{An} \diamond & P_{An}(x - v_x/2, y - v_y/2, T_{An}) \\ W_{Bn} \diamond & P_{Bn}(x + v_x/2, y + v_y/2, T_{Bn}) \\ W_{\beta n} \diamond & P_{\beta n}(x - 1, y, T_{\beta n}) \end{Bmatrix} \quad (7)$$

where $W_{An}$, $W_{Bn}$ and $W_{\beta n}$ describe masks around the specific vector-addressed pixels and $\diamond$ denotes the duplication operator which indicates how often a sampling value is introduced into the filter mask. The pixels in the fields $A_n(T_{-10ms})$ and $B_n(T_{+10ms})$, around which filter masks are positioned, are each shifted relative to the pixel (x, y) to be interpolated in the intermediate image $\beta_n(T_0)$ by a fraction of the motion vector. This fraction in FIG. 5 corresponds to half the motion vector, since the intermediate image $\beta_n(T_0)$ to be interpolated is located temporally precisely in the center between the fields $A_n(T_{-10ms})$ and $B_n(T_{+10ms})$. If the motion vector in one of the fields indicates an image line which does not exist in the corresponding field, a re-interpolation takes place.

The advantage of vector-based weighted median filters is the fact that they are able to correct faulty motion vectors up to a certain error size. This is especially significant since vector errors cannot be avoided in natural image sequences.

The property of correcting vector errors is illustrated based on the model of a horizontally moving ideal vertical edge between bright and dark pixels illustrated in FIG. 6, where the faulty motion vector is estimated. FIG. 6 illustrates one line each of fields $A_n$, $B_n$ as well as the intermediate image $\beta_n$, and the respective erroneously estimated vectors.

In the example, it is assumed that the model edge is moving at a velocity of $v_{xreal}=4$ pixels/field, while the velocity has been erroneously estimated at $v_{xest}=0$ pixel/field. The result is that the median masks in the previous and following images have been positioned at the same location, whereas the masks should have been correctly displaced relative to each other by 4 pixels.

In the example of FIG. 6, the median filter is supplied with image information from seven pixels of field $A_n$ including from the pixel $x_0$ which marks the beginning of the dark region after the edge, which pixels lie within the selection mask, the mask under the image line being illustrated by a bold outline. The median filter is also supplied with the image information from seven pixels of field $B_n$ which lie outside the selection mask, outlined in bold above the image line. The positions of these pixels correspond to the positions of the relevant pixels of field $A_n$, since the selection mask was not shifted as a result of the incorrect estimation of motion. It is evident that the median filter has been supplied with image information or luminance information from eight dark pixels after the edge, and six bright pixels before the edge. The result of the median filtering of these pixels is a dark pixel, even giving uniformly weighted selection masks, which pixel is interpolated in the intermediate image at position x.

As a result of the median filter, the edge in the intermediate image $\beta_n$ that lies temporally in the center between fields $A_n$, $B_n$ is correctly interpolated to a position, despite the faulty motion vectors, which corresponds to half the distance between the edge in field $A_n$ and the edge in field $B_n$, as can be verified by the generation of luminance balances between the bright and dark pixels.

A linear interpolation filter, on the other hand, produces a 4 pixel wide region of medium luminance, and thus causes a noticeable blurring of the edge.

In addition to the behavior of a correlated video signal, such as edges or areas, the behavior of a non-correlated video signal (such as irregular textures) may also be examined. It may be shown that weighted median filters are able, given proper selection of the filter weights, to obtain the details of the non-correlated image information when the correct estimation of motion is used. In the event a vector is erroneously estimated, fine details are extinguished, a result that is preferred for 50 Hz to 100 Hz conversion over an erroneous position display.

The masks illustrated in FIG. 8 are employed as the median masks in the lows channel. A star-shaped selection mask is used for the pixels to be selected from fields $A_n$ and $B_n$, the starting points and end points of the motion vector $V_{AnBn}$ each being weighted by a factor 5 times greater than the surrounding values (factor 1). The median filter is additionally supplied with image information from a pixel of an intermediate image already determined. A 3-tap median filtering takes place in the image regions uncovered in the lows channel.

For the highs channel (FIG. 7), raster-dominant median filters are applied, as was previously the case in the static method described above, the difference being that these are now vector-addressed. This method is illustrated in FIG. 8.

An IC implementation of an intermediate image interpolation method based on weighted median filters is known. The implementation utilizes an IC for format conversion based on a reliability-controlled median filter.

An interpolation method is known that is also based on weighted median filters. However, here there is no separation of highs/lows, and no linear re-interpolation is performed if the vector addresses a line not present in the field. Instead, the median mask of FIG. 9a is applied for the case in which the vector addresses an existing line, otherwise the median mask of FIG. 9b is applied. If the sum total of the filter weights is an even number, the already calculated pixel of the intermediate image located to the left and above the actual position is incorporated into the median filter.

The interpolation method illustrated in FIG. 8 achieves a relatively good interpolation quality for conversion of 50 Hz interlaced signals to 100 Hz interlaced signals, this being attributable to the error correction properties of weighted median filters.

If one considers a format conversion in which the ratio of input image rate to output image rate deviates from the 50:100 ratio above, then other limiting conditions come into play. This is evident in FIG. 10 which illustrates the temporal positions of the input images for different output image rates when compared to a 50 Hz input sequence.

In the conversion to 100 Hz already considered, either the images of the output sequence temporally match an image of the input sequence, or the intermediate images to be interpolated are located in the display temporally precisely in between two input images. The second case produces the vector projection illustrated in FIG. 4 in which the measured or estimated motion vectors $V_{AnBn}$, starting from a given pixel of the intermediate image, are projected with a projection factor of 0.5 into the previous or following original image, i.e., the image information of a pixel in the intermediate image is interpolated using the pixels located in those regions of the input images which lie at a distance calculated as a motion vector multiplied by 0.5 from the point to be interpolated.

In the case of other image rate ratios, however, intermediate images must be interpolated at temporal positions which are not located precisely in the center between two input images, with the result that projection factors other than 0.5 are produced for the intermediate images to be interpolated.

In addition, it is also evident that considerably more than one intermediate image to be temporally interpolated may lie between two output images which temporally precisely match one input image. Given a frequency of $f_{org}=50$ Hz for the input sequence, and an output frequency of $f_{int}=60$ Hz for the interpolated sequence, only every sixth output image, for example, temporally matches a given input image. Since the ratio of interpolated images to original images thus turns out to be significantly greater than for the conversion to $f_{int}=100$ Hz, the quality requirements to be met by the interpolation method are similarly significantly higher as well.

In general, all possible projection factors produced by a conversion from $f_{org}$ to $f_{int}$ are determined by the equations:

$$p_{left}=k \cdot f_{org}/f_{int} - \lfloor k \cdot f_{org}/f_{int} \rfloor \quad (8)$$

and $$p_{right}=1-p_{left}=1-k \cdot f_{org}/f_{int}+\lfloor k \cdot f_{org}/f_{int} \rfloor \quad (9)$$

where $k=0, 1, 2, \ldots, k_{max}-1$ and $k_{max}=f_{int}/\gcd(f_{org},f_{int})$, and where $\lfloor k \cdot f_{org}/f_{int} \rfloor$ is the integer fraction of $k \cdot f_{org}/f_{int}$, and gcd denotes the operation for determining the greatest common divisor.

The projection factor $p_{left}$ thus denotes temporal distance normalized for the period of the original signal between the intermediate image to be interpolated and the particular previous image/field, where the period represents the temporal distance between two successive images/fields of the original image sequence. In analogous fashion, $p_{right}$ denotes the temporal distance normalized for the period of the original signal between the intermediate image to be interpolated and the particular following image/field. The two projection factors $p_{right}$ and $p_{left}$ add up to 1.

It is evident that precisely $k_{max}$ different interpolation phases or projection factor pairs, each with one left and right projection factors, are produced for an image rate conversion of $f_{org}$ to $f_{int}$. Subsequently, a cyclic repetition of the projection factors takes place.

The effect of vector errors for different projection factors varies in magnitude, as will be explained below where these effects of faulty motion vectors are examined in more detail for different projection phases.

For the sake of illustration, it is assumed that for a conversion of 50 Hz to 60 Hz the image $\zeta_1$ of a 60-Hz sequence is to be interpolated from field $A_3$ and $B_3$ of the 50-Hz sequence as illustrated in FIG. 10. The associated projection factors $p_{left}$ into the previous original image $A_3$ and $p_{right}$ into the following original image $B_3$ are determined to be $p_{left}=\frac{1}{6}$ and $p_{right}=\frac{5}{6}$.

The following discussion is based, for the sake of illustration, on a progressive image display. However, the problems discussed are also found in analogous manner in an interlaced display.

For the sake of illustration, it is assumed that the estimated velocity is $v_{est}=(12, 12)$, thereby producing on the previous image $A_3$ a projected velocity of $$vp_{left}=p_{left} \cdot v_{est}=1/6 \cdot (12,12)=(2,2) \quad (10)$$

and on the following image $B_3$ a projected velocity of $$vp_{right}=p_{right} \cdot v_{est}=5/6 \cdot (12,12)=(10,10) \quad (11)$$

with which the interpolation filter in the previous and following image $A_3$, $B_3$ are addressed or positioned starting from the pixel to be interpolated. The position of the pixel to be interpolated and the address position of the filter, which are shifted by $Vp_{right}$ or $vp_{left}$ starting from the point to be interpolated, are displayed in the intermediate image $\zeta$ in FIG. 11. The addressing position denotes the position of the pixels in the original images onto which a filter mask for the selection of pixels to filter is placed. Given a correct estimation of the motion vector, the address positions correspond to the starting and end positions of a pixel moving from image A to image B.

If it is now assumed that the estimated motion vector has a maximum error of ±6 in the x axis and y axis, the error regions illustrated as shaded in FIG. 11 are produced after vector projection, the positioning of the filter masks in original image B being relatively more strongly a function of vector errors than is the positioning of the filter in original image A.

In another example illustrating the effect of a vector error, again in regard to conversion from 50 Hz to 60 Hz, the image $\zeta_1$ of FIG. 10 is interpolated from the original images $A_3$ and $B_3$, where the applicable terms for the projection factors are: $p_{left}=\frac{1}{6}$ and $p_{right}=\frac{5}{6}$.

FIG. 12 illustrates the case in which an ideal vertical edge is moving horizontally at a velocity $v_{real}=6$ pixels/image. The estimated velocity, however, is $v_{est}=0$, with the result that filter masks $W_A$ in image A and $W_B$ in image B are positioned at the same place.

If the same filter masks are used for image A and image B, an interpolation of the moving edge in intermediate image $\zeta$ results at a position corresponding to half the distance between the edge in image A and in image B. This position is incorrect since the intermediate image to be interpolated does not lie temporally in the center between images A and B.

What is needed is a method and a device for converting video signals that is capable of supplying a correct interpolation of intermediate images even in cases in which the ratio of the frequency of output image sequence to input image sequence deviates from 100:50, and in particular does not have an integer value.

SUMMARY OF THE INVENTION

Briefly, according to an aspect of the invention, a method for the motion-vector-based conversion of a first video signal which contains a first image sequence at a first frequency to a second video signal which contains a second image sequence at a second frequency, where at least some of the images of the second image sequence which are phase-shifted relative to the images of the first image sequence are generated by an interpolation of the images of the first image sequence such that, for a pixel of an image from the second image sequence, pixels at least from one first image and from one second image of the first image sequence are filtered by a median filter, where the median filter is an adaptively weighted median filter.

In one embodiment, the median filter is dependent on an interpolation phase between the image to be interpolated of the second image sequence and the first and/or second image of the first image sequence, and therefore adaptively weighted as a function of the projection factors.

According to other embodiments, provision is made to adaptively weight the median filter as a function of local image information or of properties of a vector field of motion vectors.

In one embodiment of the method, for each of multiple different interpolation phases a first filter mask is generated which determines the selection and weighting of the pixels of the first image for median filtering, and a second filter mask is generated which determines the selection and weighting of the pixels of the second image for median filtering. These filter masks are selected and employed for filtering as a function of the instantaneous interpolation phase.

The following criteria may be taken into account when generating the filter masks or filters:

- The filter masks are selected so that a moving ideal horizontal or vertical edge is interpolated to the correct edge position for the specific interpolation phase regardless of an estimation error.
- Given a correctly estimated motion vector, fine image details should also be preserved; this may be achieved by having the sum of the central weights of both filter masks be larger than the sum of the remaining weights.
- The correctability of a weighted median filter generally increases with its size. For this reason, the extension of the filter masks preferably becomes larger as the associated projection factor becomes larger to allow the resulting larger erroneous regions to be corrected.
- Since the information from the image with the smaller projection factor is as a rule more reliable, the majority of the filter weights are preferably assigned to the smaller projection factor, this effect becoming all the more pronounced the more the projection factors differ.
- The probability that a mask will overlap multiple objects, and thus cause interpolation errors due to a violation of the model assumption (a moving edge), increases with increasing mask size. Detection of critical regions, for example edge detection, enables appropriate adaptation of the filter size. According to one embodiment, more than one first filter mask and more than one second filter mask are provided for each interpolation phase, which masks are correspondingly capable of filtering differently structured image regions, and to select the filter masks as a function of the detection of such image regions.
- The reliability of the motion vectors is not uniform throughout the image. For example, due to the generally block-by-block estimation of motion, greater unreliability must be assumed in transitional regions between different vectors than within homogenous vector regions. In addition, the similarity measure by which the motion vectors are determined may be used for an assessment of reliability. Similarly, greater inaccuracies must be generally expected for greater vector quantities. For this reason, one embodiment adapts the size and weighting of the filter masks to the reliability of the motion vectors.

In addition, the velocity determined from the motion vector is also taken into account when generating the filter masks to be able to include a maximum correctable vector error for the motion vector in the design of the filter so that for an interpolation phase determined by the projection factor, multiple different filter masks may be archived or generated as a function of the velocity and the maximum correctable vector error.

Taking into account the above criteria, one-dimensional or two-dimensional weighted median filters may be developed using fairly well known, suitable filter design methods. The filters allow for a complete compensation of estimation errors within a specified error quantity with regard to the above requirements and to ideal horizontal or vertical edges.

Complete compensation of an estimation error means that, for example, given an estimation error of ±6, the filter is able to correct the entire error region $\{-6, -6, \ldots, -1, 0, 1, \ldots, 5, 6\}$, taking into account the particular rounding concept to obtain pixel-precise filter addressing.

These and other objects, features and advantages of the present invention will become more apparent in light of the following detailed description of preferred embodiments thereof, as illustrated in the accompanying drawings.

DETAILED DESCRIPTION OF THE INVENTION

Figure 13:
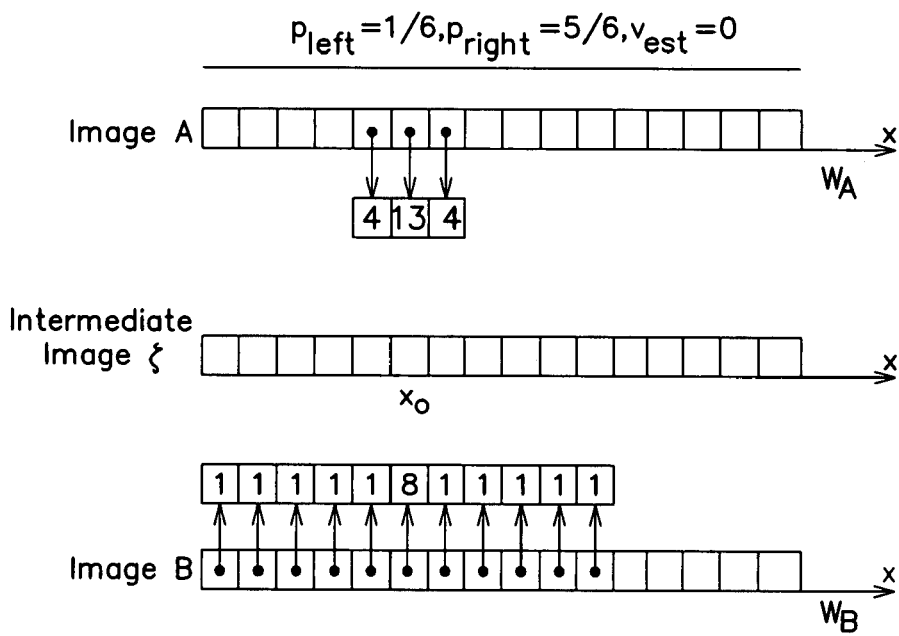
FIG. 13 illustrates one line each of a first and second image of an original sequence, and a line of an interpolated intermediate image, with an adaptively weighted median filter as an interpolation filter.

FIG. 13 illustrates one line each of successive images A and B of an intermediate image ζ generated by the method according to the invention. The example assumes that one edge moves between bright and dark pixels with a velocity of $v_{xreal}$=6 pixels/image, and a motion vector has not been correctly estimated at $v_{est}$=0 pixel/field.

Figure 1:
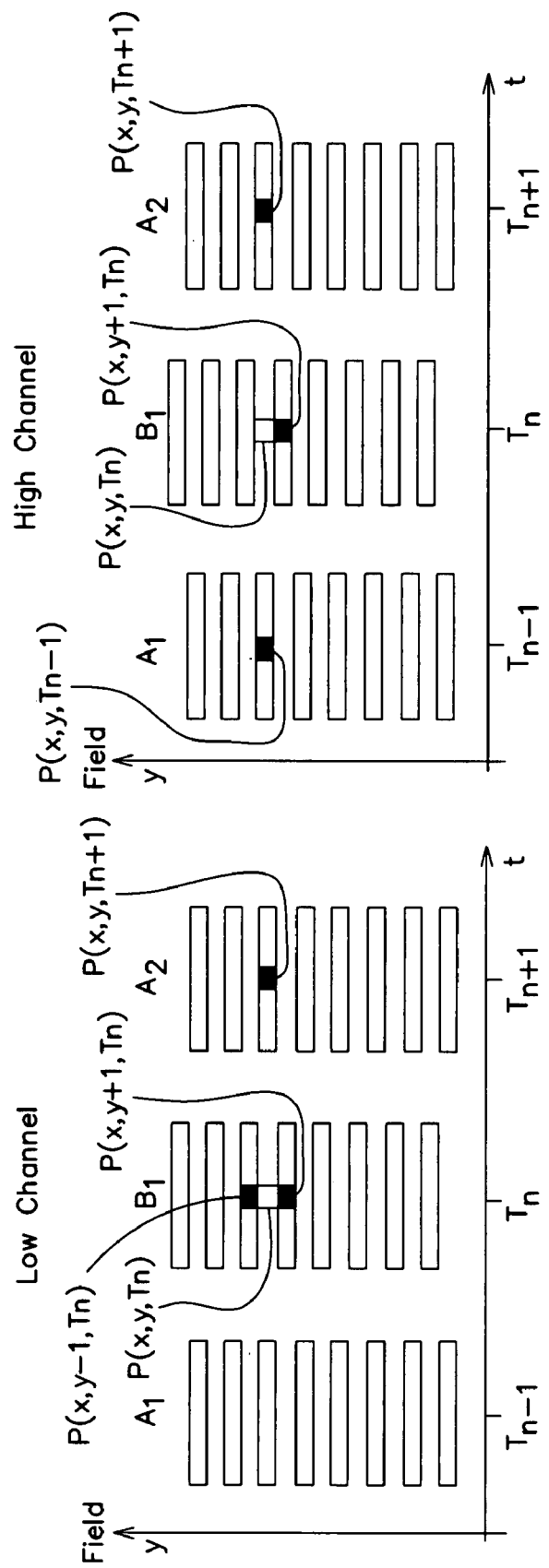
FIG. 1 illustrates a method for generating pixels of an image line using a median filter according to the prior art.
Figure 2:
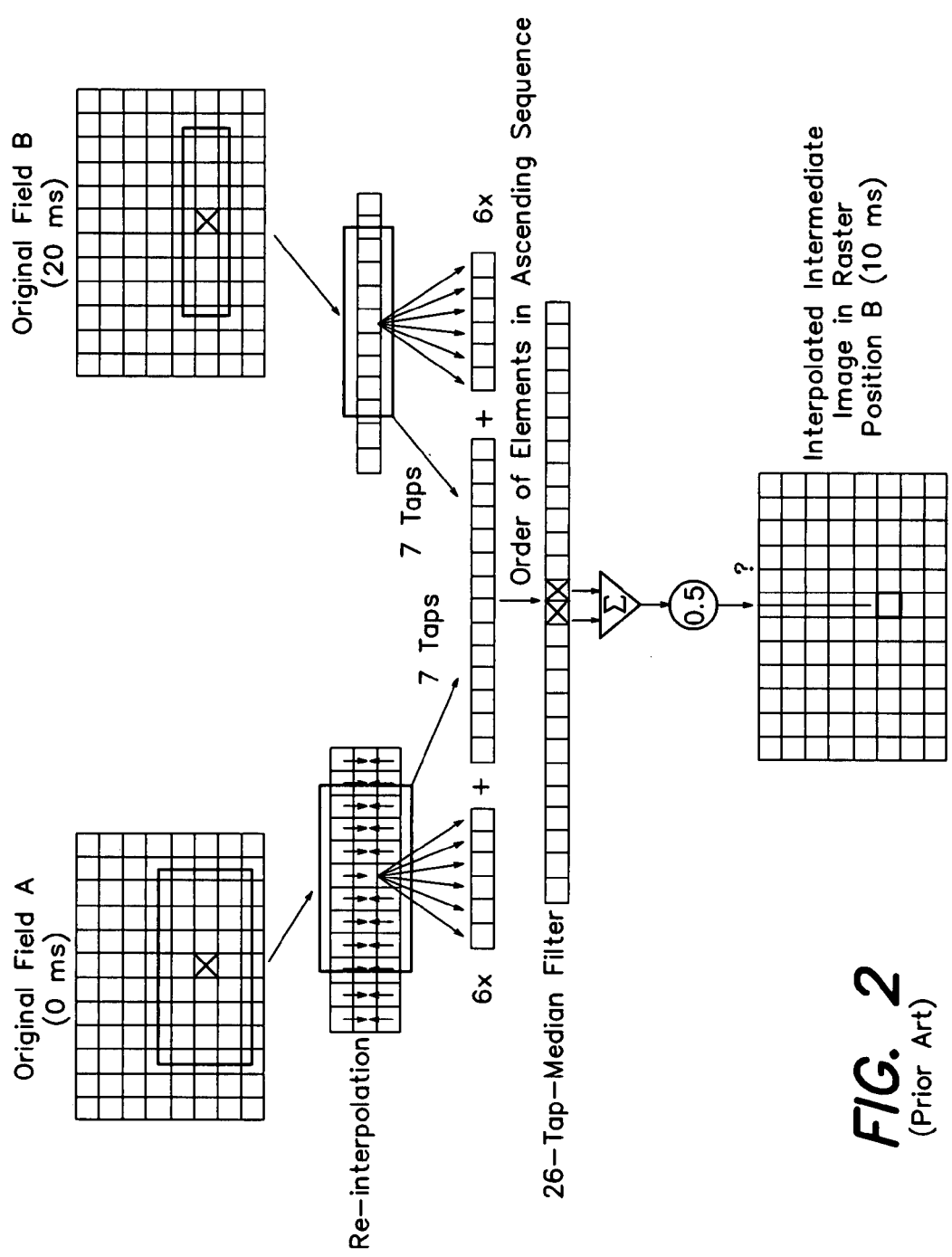
FIG. 2 illustrates a method for generating a 100 Hz video signal from a 50 Hz video signal using median filtering for a lows channel according to the prior art.
Figure 3:
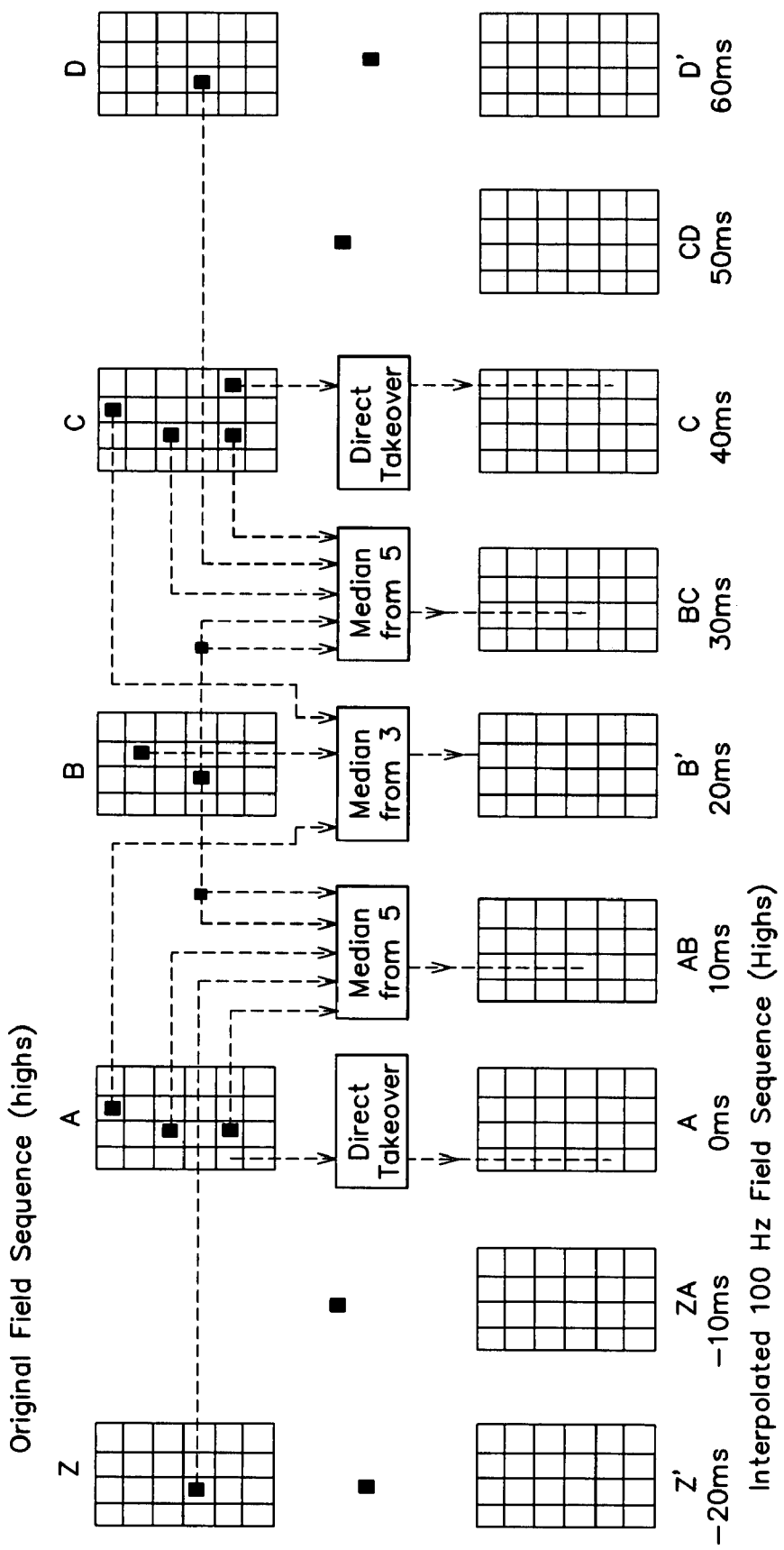
FIG. 3 illustrates a method for generating a 100 Hz video signal from a 50 Hz video signal using median filtering for a highs channel according to the prior art.
Figure 4:
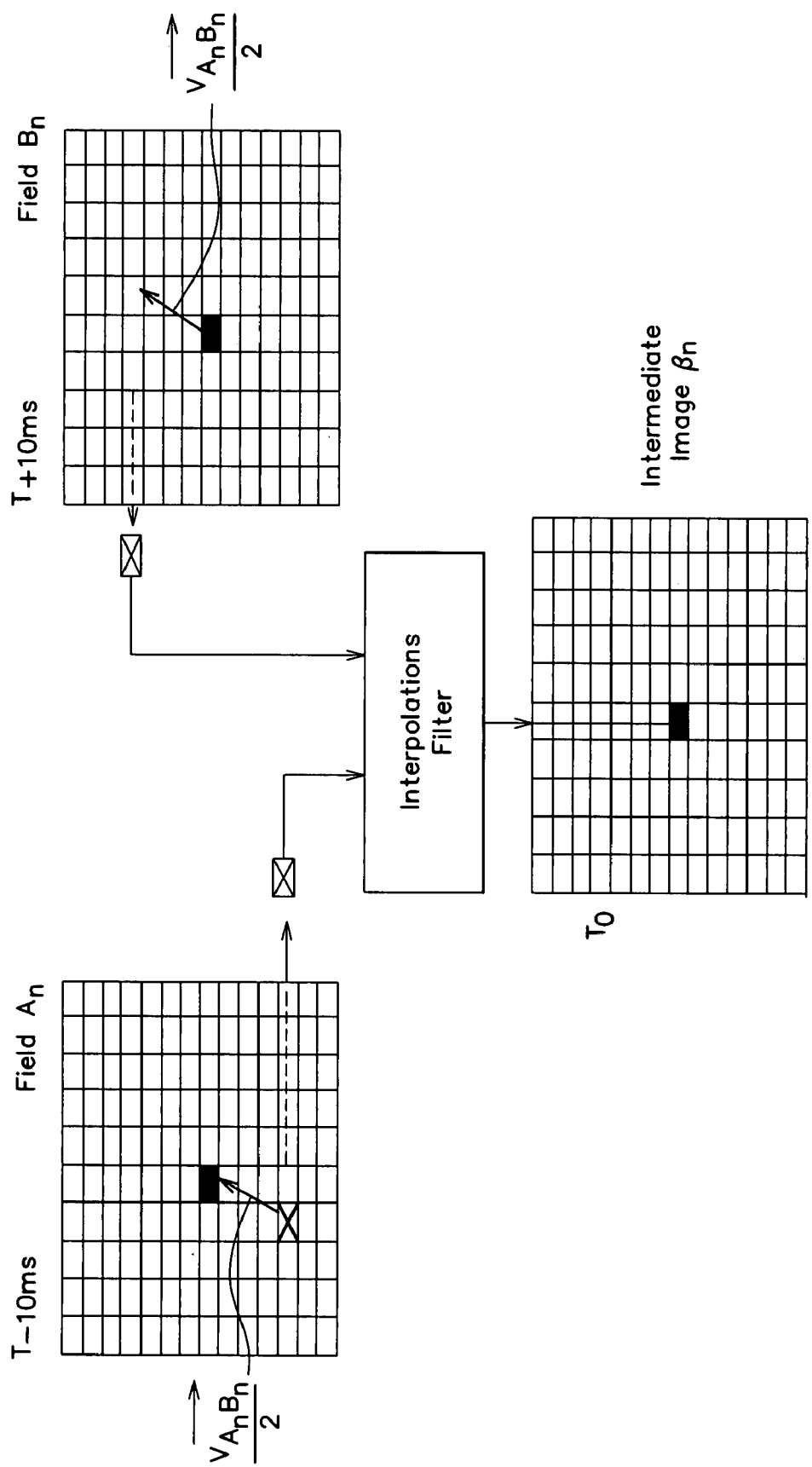
FIG. 4 illustrates a method for the motion-vector-based generation of an intermediate image from two fields of an original image sequence using an interpolation filter.
Figure 5:
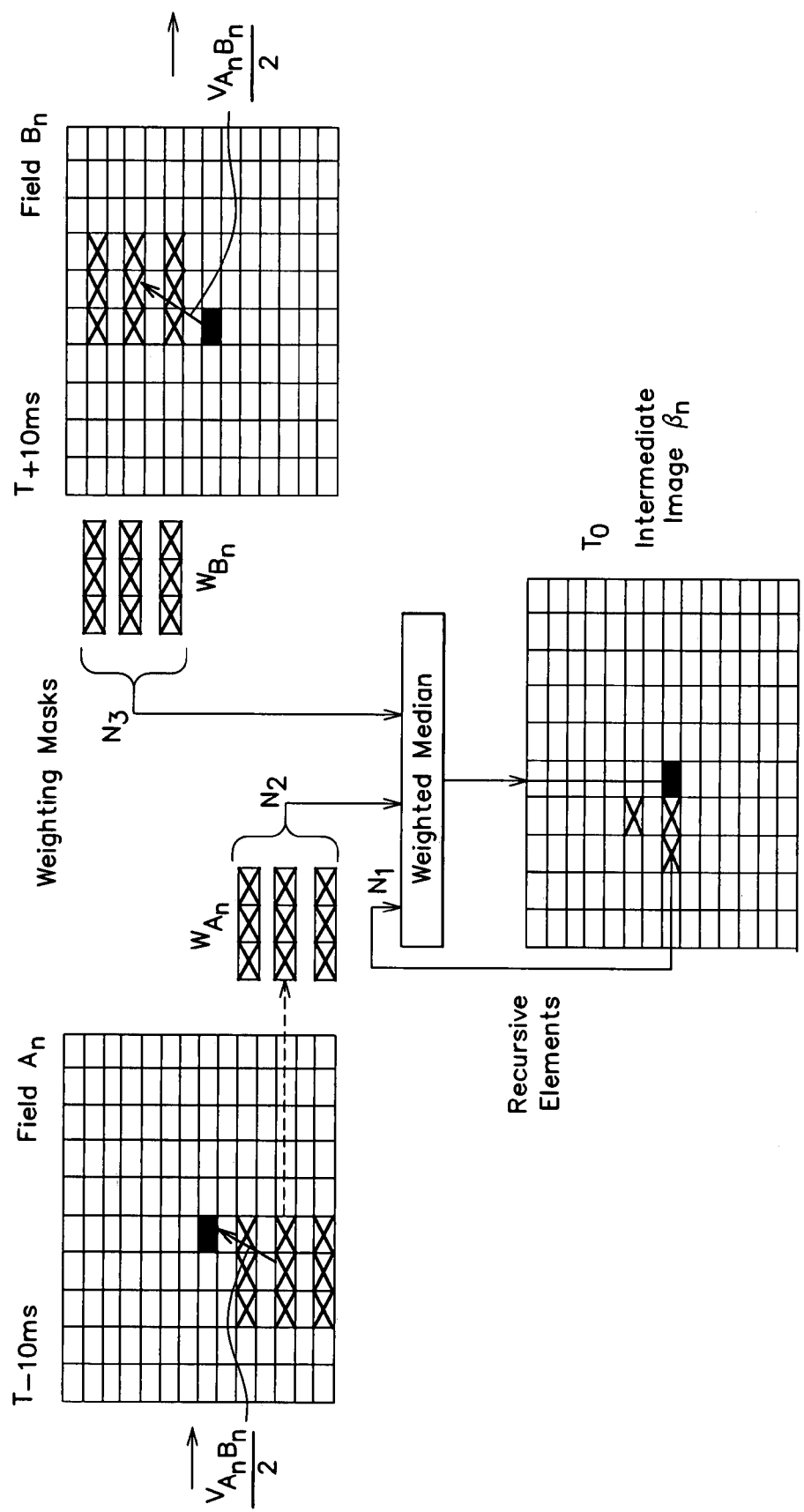
FIG. 5 illustrates a method for generating a motion-vector-based intermediate image from two fields of an original image sequence using a weighted median filter as the interpolation filter.
Figure 6:
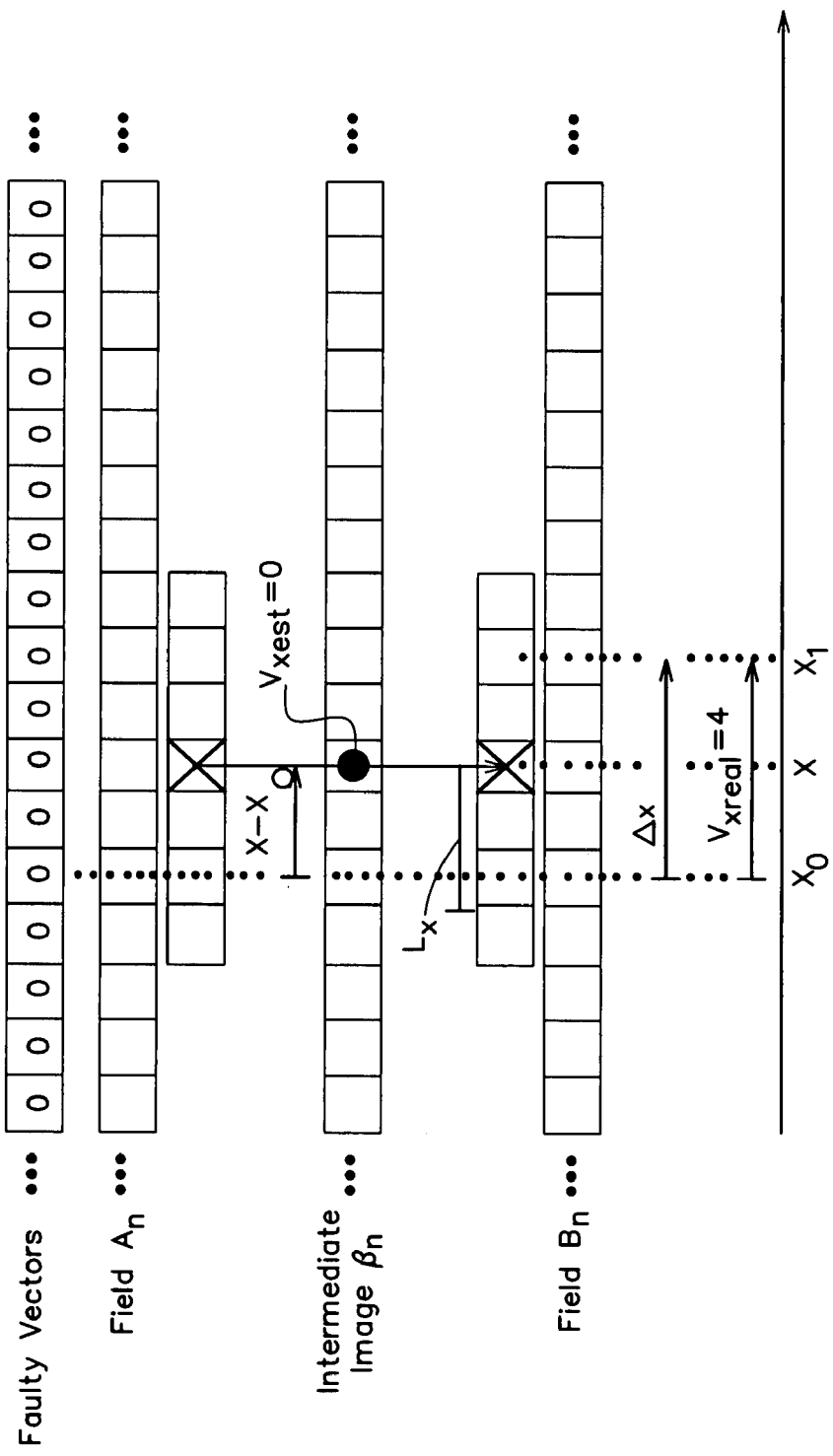
FIG. 6 illustrates the motion-vector-based generation of an intermediate image from two fields of an original image sequence based on a selected line of the intermediate image.
Figure 7:
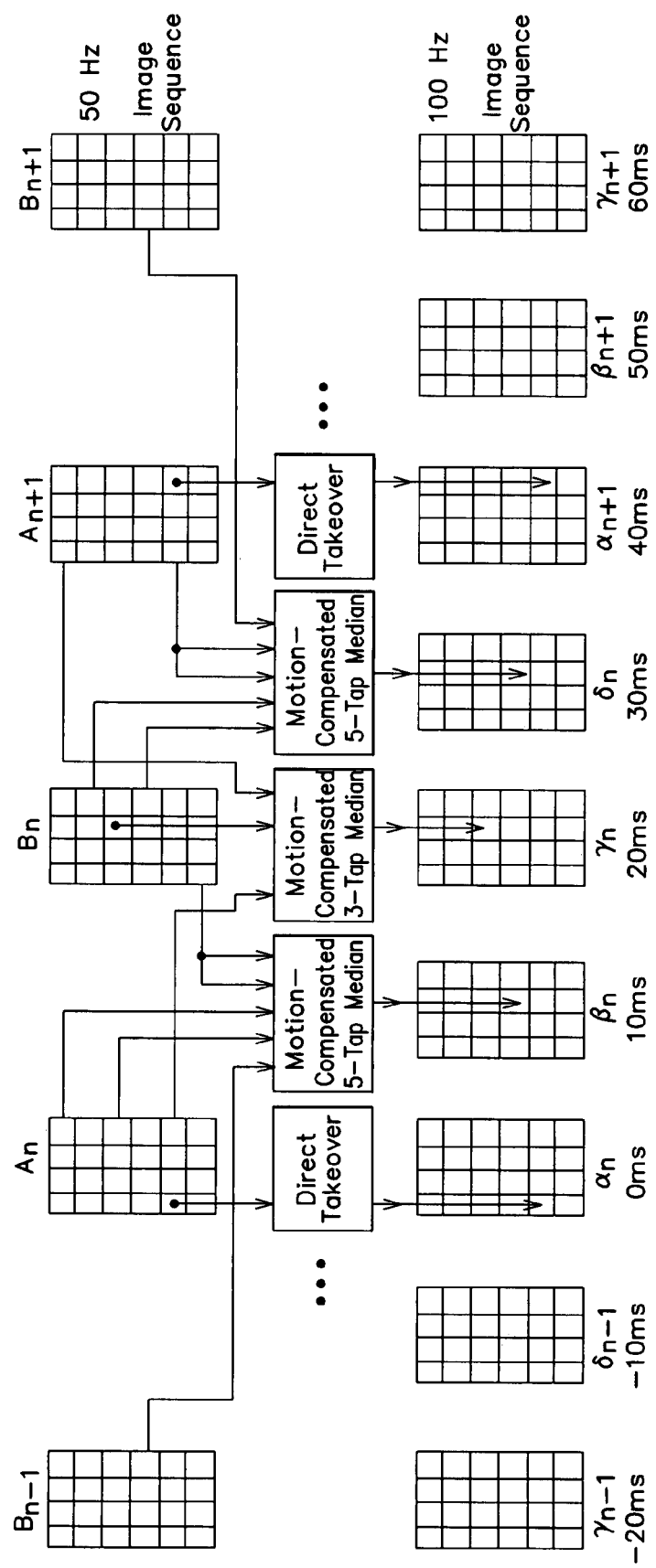
FIG. 7 illustrates an interpolation method for a highs channel.
Figure 8:
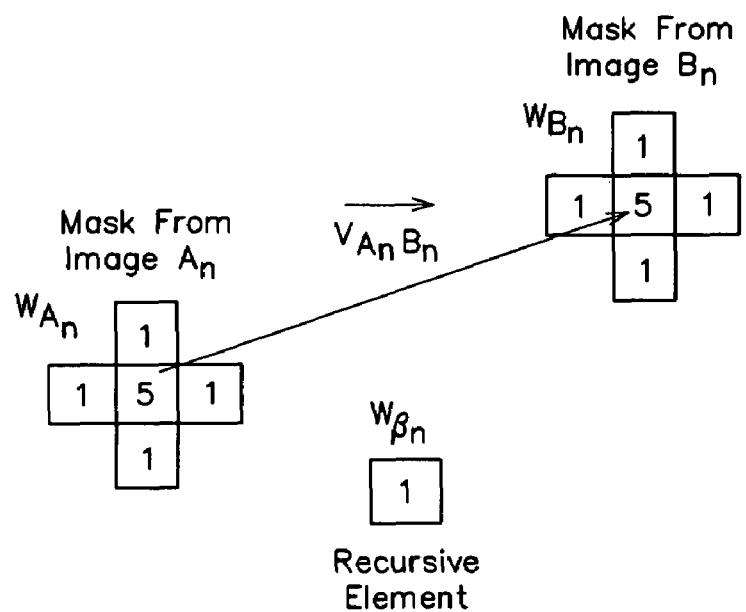
FIG. 8 illustrates filter masks for interpolation methods.
Figure 9A:
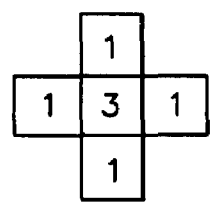
FIG. 9 illustrates interpolation masks.
Figure 9B:
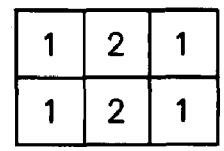
Figure 10:
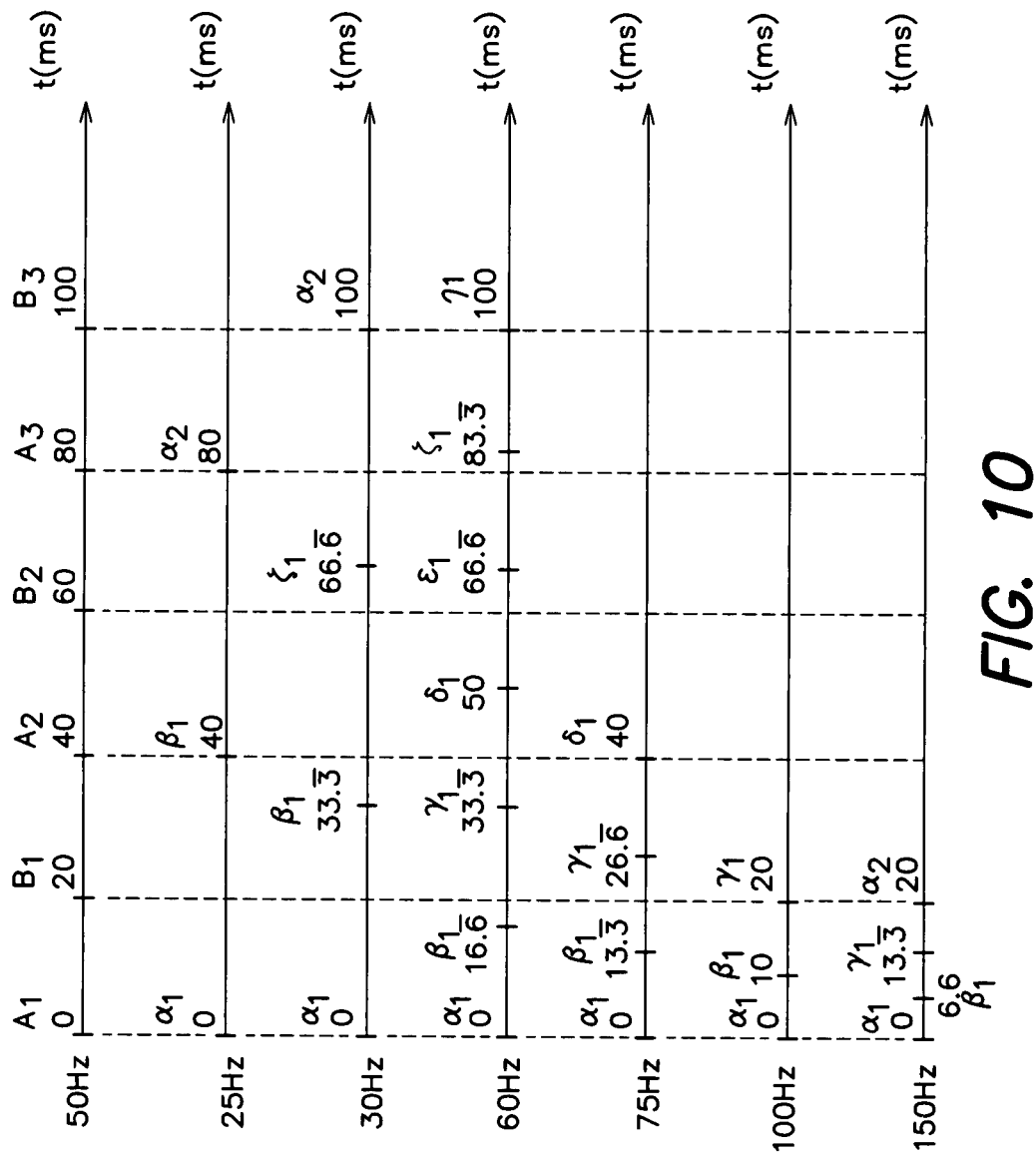
FIG. 10 illustrates the temporal positions of images from interpolated image sequences as compared with a 50 Hz original sequence.
Figure 11:
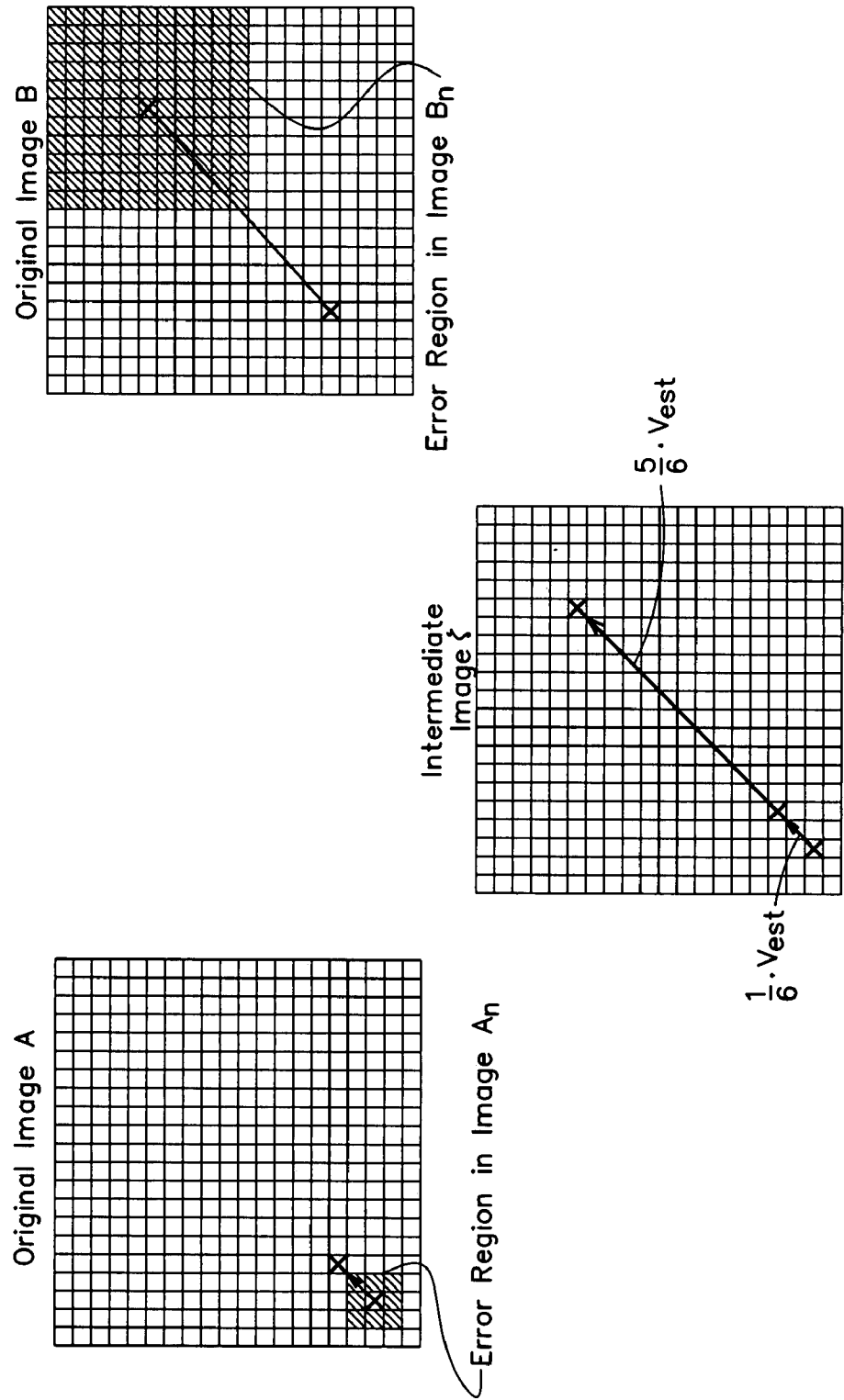
FIG. 11 illustrates the effect of an estimation error for different projection factors.
Figure 12:
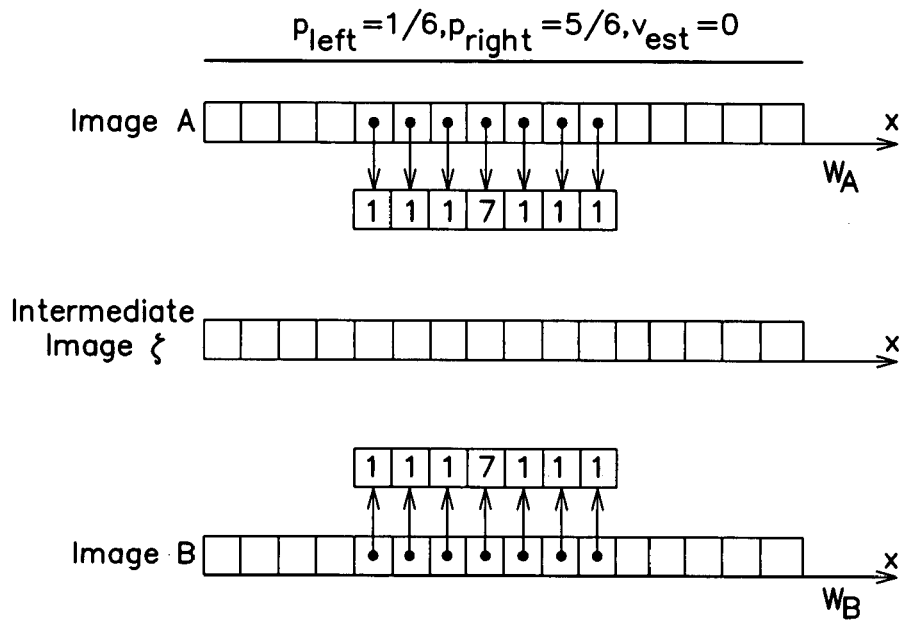
FIG. 12 illustrates one line each of a first and second image of an original sequence, and a line of an interpolated intermediate image, using non-adapted filters.

Let the intermediate image ζ in the example be an intermediate image of the 60 Hz image sequence illustrated in FIG. 10, and let the images A and B be images of the 50 Hz image sequence illustrated in FIG. 10, where images A and B may be either fields or frames. In the example, the expression $p_{left}$=1/6 applies for the left projection factor, while the corresponding expression $p_{right}$=1-$p_{left}$=5/6 applies for the right projection factor.

A filter mask $W_A$ is shown under the line of image A indicating which of the pixels of the line is given which weighting of a median filtering. A second filter mask $W_B$ is shown above the line of image B indicating which of the pixels of the line is given which weighting of the median filtering. Both filters are positioned to select pixels by a starting point of the motion vector in image A, or by an end point of the motion vector in image B, although in the example these points coincide at point $x_0$ since the motion vector has been estimated to be zero. If the motion vector had been correctly estimated at $v_{xreal}$, the filter mask $W_B$ would be displaced to the right by six pixels.

In the filter masks shown, the central pixels determining the starting point and end point of the motion vector are more strongly weighted that the surrounding pixels, although the filter weights—in contrast to what is shown—may also decrease starting from the central pixel outwards with increasing distance from the central pixel. The pixel to be interpolated of the intermediate image lies $vp_{left}=p_{left}\cdot V_{est}$ pixels to the right relative to the starting point of the motion vector, and $vp_{right}=p_{right}\cdot v_{est}$ pixels to the left relative to the end point of the motion vector; its position here, given the incorrect estimation of the motion vector in the example, corresponds to the position of pixel $x_0$.

The projection factor $p_{left}$ in FIG. 13 represents a measure of the normalized temporal distance between the image A and the intermediate image ζ, while the projection factor $p_{right}$ represents a measure of the normalized temporal distance between the intermediate image ζ and the image B, these projection factors being increasingly smaller as the temporal distance becomes smaller. The projection factors are thus a measure of the particular interpolation phase, i.e., the temporal position of the intermediate image ζ relative to the original images A, B, although during a conversion of $f_{org}$ (e.g. 50 Hz) to $f_{int}$ (e.g. 60 Hz) these interpolation phases change from intermediate image to intermediate image within a cycle determined by the ratio of these frequencies.

According to the invention, the filter masks are adaptively weighted as a function of the interpolation phases, i.e., as a function of the projection factors $p_{left}$, $p_{right}$. The filter mask $W_A$ assigned to the projection factor $p_{left}$ has a smaller extension since the reliability of the image information of the image A lying temporally closer to the intermediate image may be ranked as being higher than the reliability of the image B lying temporally more distant from the intermediate image, and the extension of the filter increases with decreasing reliability of the image information. For the projection phase shown with $p_{left}$=1/6 or $p_{right}$=5/6, the filter mask $W_A$ has an extension of three pixels, while the filter mask $W_B$ has an extension of eleven pixels. The majority of the filter weights lie at 4+13+4=21 with the filter mask $W_A$ which weights the more reliable image information of the image A, as compared with a total weight of 1+1+1+1+1+8+1+1+1+1=18 for the filter mask $W_B$.

The pixels of the intermediate line can be generated by median-filtering the pixels of the images A and B using the masks $W_A$ and $W_B$. It is evident that, due to the interpolation-phase-dependent weighting of the filter masks $W_A$, $W_B$, the edge of the intermediate image has been correctly shifted by one pixel relative to the edge in the image A, and by 5 pixels relative to the edge in the image B, in accordance with the phase position of the intermediate image relative to the images A and B. As a result, a motion-correct interpolation of the moving edge may be implemented in spite of the incorrectly estimated vector by using the adapted filter masks illustrated in FIG. 13. It is evident that the moving edge has been interpolated with the correct position at $V_{real}/6$.

Information introduced from an image with a small projection factor (image A in FIG. 13) is significantly less dependent on the vector error, and may thus be ranked as more reliable information than that which has been introduced from an image with a larger projection factor (image B in FIG. 13). In addition, the correlation of an image with a smaller projection factor is generally larger relative to the intermediate image to be interpolated since they lie temporally closer together. The application according to the invention of filter masks adapted to the actual interpolation phase, and thus to the specific projection factors (polyphase interpolation filters) for the interpolation, exploits this fact to correctly interpolate intermediate images even in the event of incorrect estimation of motion.

According to the invention, provision is made to design a set of filters, of which at least one filter is assigned to one interpolation phase, and to switch between these filters as a function of the interpolation phase, or possibly other criteria. The term filter in the following discussion specifically refers to a group of two or more filter masks which determine the selection and weighting of pixels in the original images, and possibly of pixels already determined in the intermediate image to be interpolated, for one filter operation, i.e., for the interpolation of one pixel.

Figure 14:
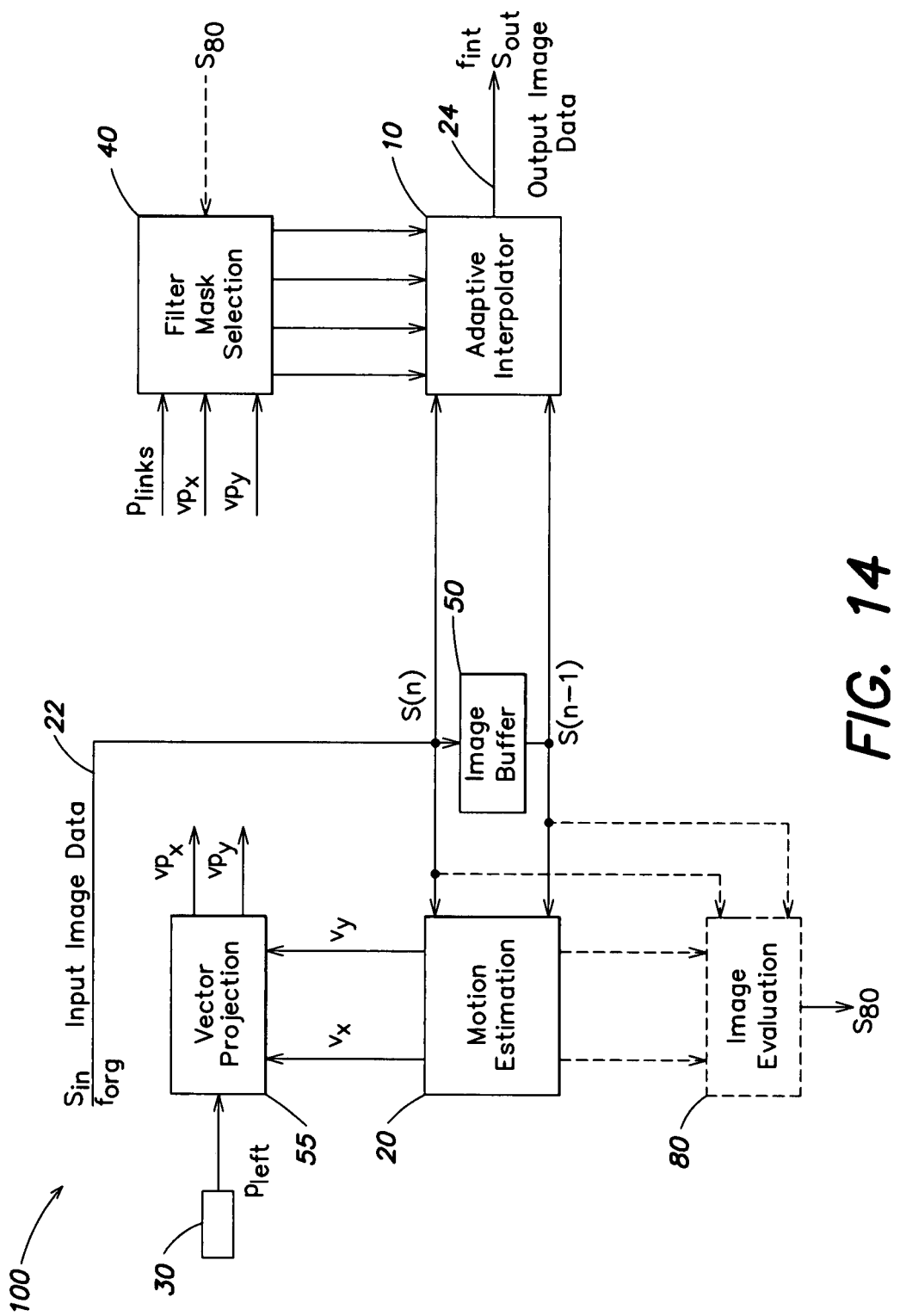
FIG. 14 illustrates a device for generating a second video signal from a first video signal using an adaptively weighted median filter without band separation.

FIG. 14 illustrates an embodiment of a device 100 for motion-vector-based conversion of a first video signal Sin on a line 22 which contains a first image sequence at a frequency $f_{org}$ to a second video signal Sout on a line 24 which contains the second image sequence at a second frequency $f_{int}$. The first video signal Sin on the line 22 is supplied to an input of the device 100 while the second video signal Sout on the line 24 is available at an output of the device 100.

The device 100 includes a motion estimation system 20 that provides a motion vector which, in the example of FIG. 14, has an x-component $v_x$ and a y-component $v_y$. To estimate motion, at least two images of the input image sequence are supplied to the motion estimation system 20, generally denoted in FIG. 14 as S(n) and S(n−1), where S(n) denotes a current image of the input image sequence and S(n−1) denotes a previous image of the input image sequence stored in an image buffer 50.

In addition, the device 100 has a system 30 that provides a projection factor $p_{left}$ dependent on the instantaneous interpolation phase. The system 30 determines all $k_{max}$ possible projection factors for a specified conversion of an input frequency $f_{org}$ to an output frequency $f_{int}$ according to equations (8) and (9), and supplies these in cyclical fashion such that the correct interpolation factor is available for each interpolation of an output image from two input images.

The device 100 also has a filter mask selection system 40 supplied with at least the determined projection factor $p_{left}$ and which is connected to an adaptive interpolator 10 which performs median filtering to provide one image each of the output image sequence from two images S(n), S(n−1) of the input image sequence. The filter masks to be used for the particular median filtering are selected by the filter mask selection system 40 as a function of the projection factor $p_{left}$, then supplied to the adaptive interpolator 10. In the filter mask selection system 40, at least one group of two filter masks is stored for each interpolation phase, i.e., for each projection factor $p_{left}$, which determine the selection and weighting of the pixels to be included in filtering from image S(n), and the selection and weighting of the pixels to be included from the image S(n−1). In addition, for each interpolation phase one filter mask may also be provided which determines the selection and weighting of already determined pixels of the intermediate image for median filtering to include these pixels as well in the filtering.

In the embodiment illustrated in FIG. 14, the selection of filter masks is performed additionally as a function of the velocity $vp_{left}$ and $vp_{right}$ projected by equations (10) and (11) so as to be able to select filter masks that are capable of correcting an error of the estimated motion vector. Since the filter masks may have different extensions or different weightings as a function of the estimated velocity, this embodiment has multiple groups of filter masks available per interpolation phase, i.e., per projection factor $p_{left}$, to be able to correct a given maximum estimation error, where one group of filter masks is selected and supplied to the adaptive interpolator 10 for each interpolation phase as a function of the projected velocities $vp_x$ and $vp_y$.

In addition, it is possible to provide different filters or filter masks for each interpolation phase, which masks differ, not only in their correction capability, but also in their estimated-error-correction property and/or detail preservation capability, for example, as a function of the local image information (for example, edges, periodic structures, etc.), value of the estimated motion vector, vector field homogeneity, or other image-related or motion-related criteria. For the filter mask selection system 40 to select such filters, additional image evaluations are required which are performed in the system 80 illustrated by dashed lines in FIG. 14, in which one output signal which functions in the filter mask selection system 40 to select appropriate filter masks during an interpolation phase is supplied to this filter mask selection system 40. Filtering with adaptively weighted median filters by the method according to the invention may be applied either to the entire image or to individual subbands in connection with band separation, as illustrated for the device 200 in FIG. 15.

Figure 15:
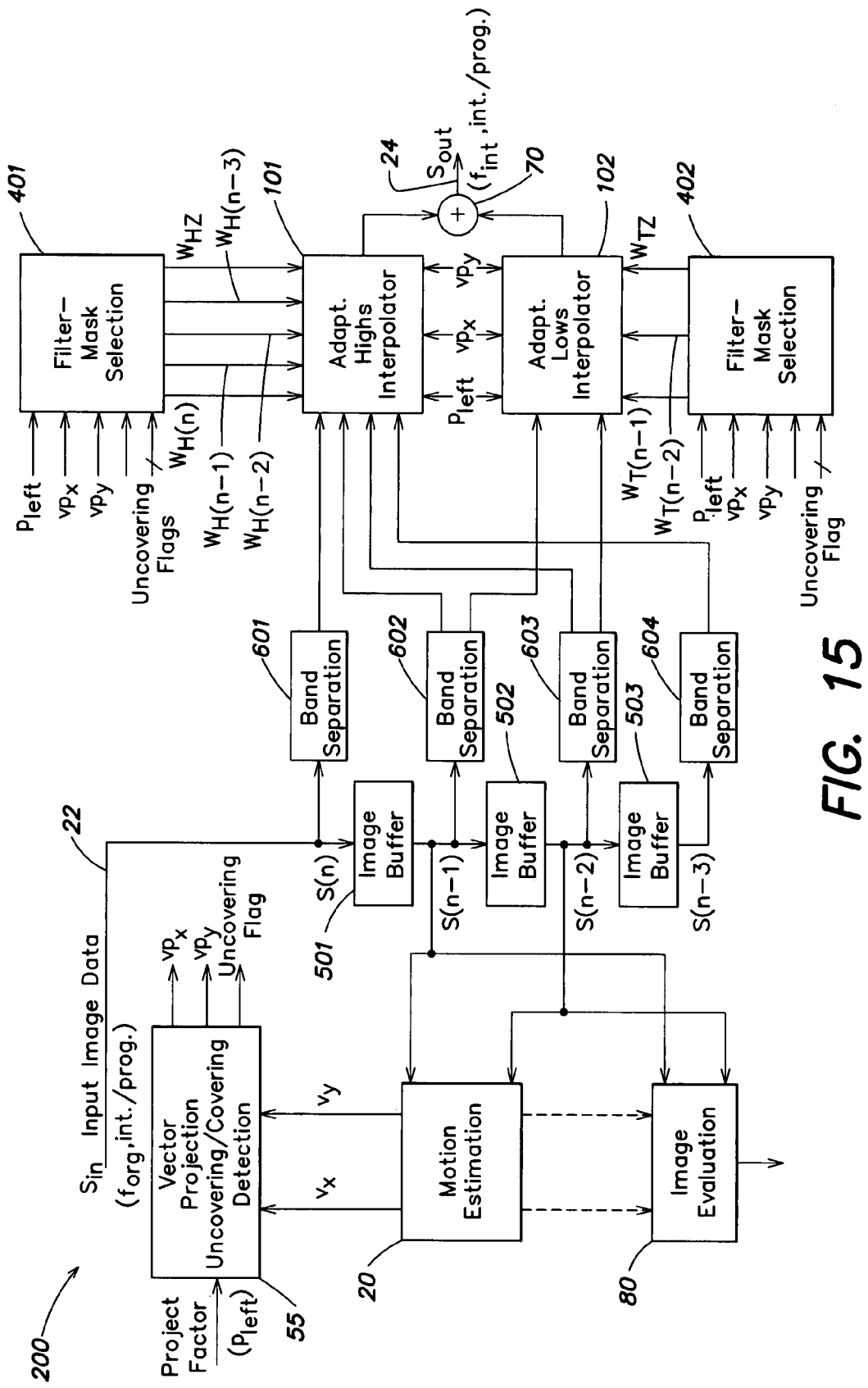
FIG. 15 illustrates a device for generating a second video signal from a first video signal using an adaptively weighted median filter with band separation.

The device 200 of FIG. 15 has an adaptive highs interpolator 101 with an adaptively weighted median filter, and an adaptive lows interpolator 102 with an adaptively weighted median filter. One filter mask selection system 401, 402 is assigned to each interpolator 101, 102. The projection factors $p_{left}$, projected velocities $vp_x$ and $vp_y$, as well as an uncovering and covering flag are supplied to the filter mask selection systems. The uncovering and covering flag, as well as the projected velocities $vp_x$ and $vp_y$, are generated in a system 55 for the purpose of vector projection or of uncovering and covering detection. The motion vector $v_x$, $v_y$ and the projection factor $p_{left}$ is supplied to this system 55.

The device 200 has three image memories 501, 502, 503 connected in series to make available a series of four images/fields of the input image sequence S(n), S(n−1), S(n−2), S(n−3). These images/fields are sent to devices 601, 602, 603, 604 for band separation. The devices 601, 604 in this embodiment simply provide a highs signal which is supplied to the adaptive highs interpolator, while devices 602, 603 each provide a highs signal and a lows signal. The lows signals is supplied to the adaptive lows interpolator 102, and the highs signals to the adaptive highs interpolator 101.

The selection of filter masks by the filter mask selection systems 401, 402 for the corresponding interpolators 101, 102 is implemented as described in connection with FIG. 14. For each individual interpolation phase the median filters or filter masks may be constant. However, multiple different median filters or filter masks may be provided for each individual interpolation phase which differ in the correction capability or in their detail preservation capability. The selected filter masks for the highs interpolator 101 and the lows interpolator 102 are, as a rule, different for each of the individual interpolation phases. The filter masks are selected as a function of the projection factors and/or as a function of the projected velocities $vp_x$, $vp_y$, and possibly in addition as a function of the uncovering and covering flag.

Vector projection as well as uncovering and covering detection are implemented in the system 50, although a generalization to random projection factors is performed.

Figure 16:
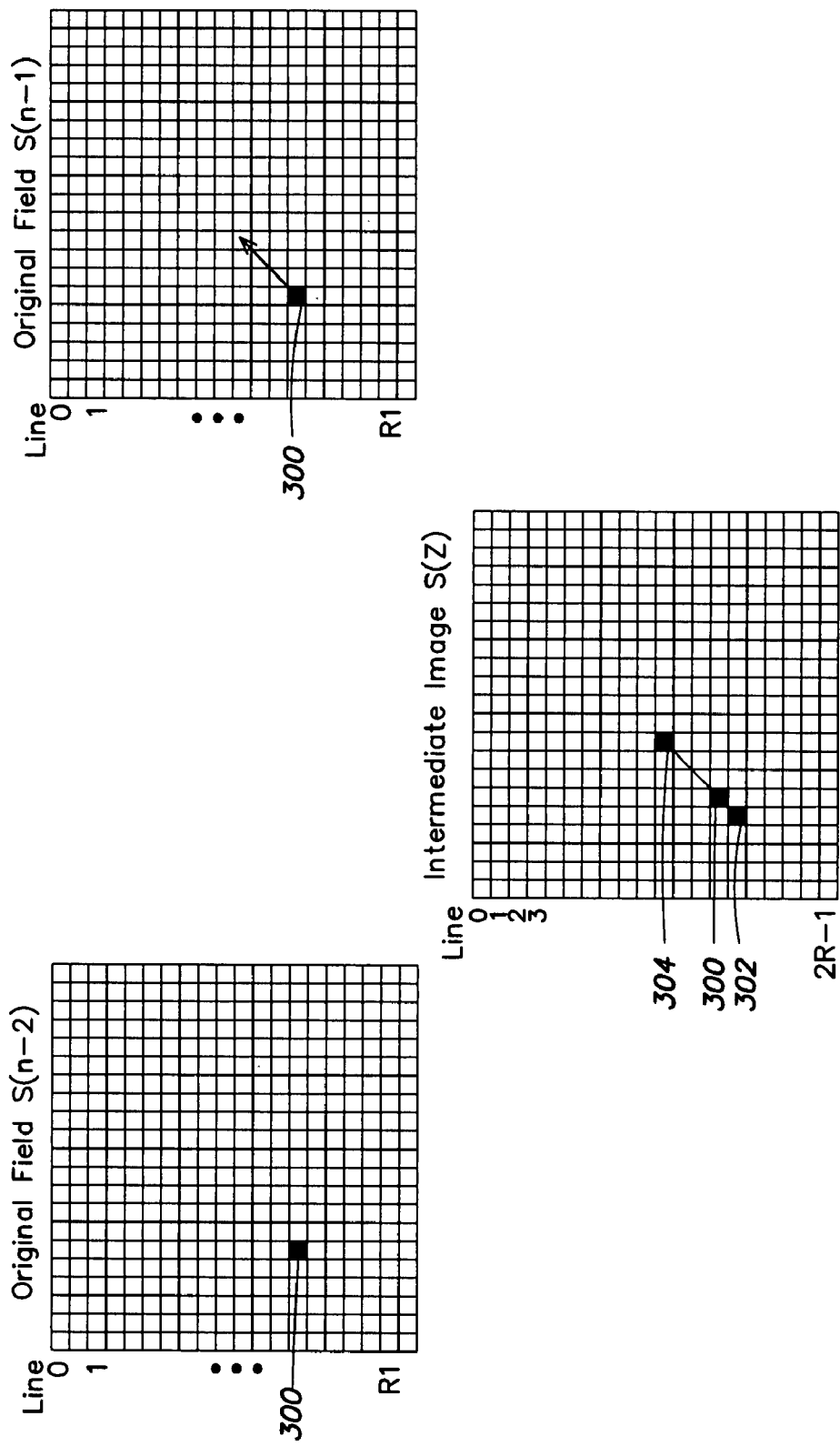
FIG. 16 illustrates an interpolation for the lows channel with band separation of the first video signal into a highs channel and a lows channel.
Figure 17:
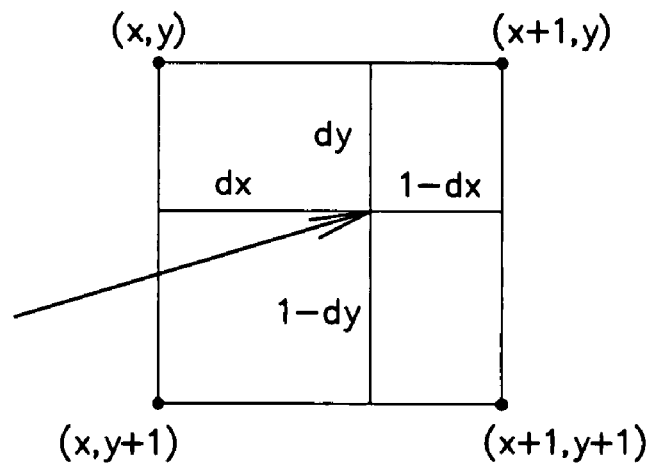
FIG. 17 illustrates a bilinear interpolation in the lows channel with band separation of the first video signal into a highs channel and a lows channel.

Various interpolations are performed for the highs channel and the lows channel. The interpolation of an intermediate image S(Z) for the lows channel from successive fields S(n−1), S(n−2) is illustrated in FIG. 16. The pixels 300 included from original fields S(n−1), S(n−2) and the pixels 302, 304 from the intermediate image are illustrated in FIG. 16. The weighting factors (which are zero when a pixel is not to be considered) are sent to the interpolators 101, 102 of the filter mask selection units 401, 402 of FIG. 15. For example, for each interpolation phase, weighting factors for equal numbers of pixels are always sent to the interpolators 101, 102, which pixels lie in the original fields S(n−1), S(n−2) in a rectangular arrangement or cruciform arrangement around the starting point and end point of the motion vector, and in the intermediate image S(Z) lie to the left or above the pixel about to be interpolated. However, individual filter masks differ for different interpolation phases in their values for the weighting factors and in their positions for which the weighting factors are not equal to zero. It is possible to supply weighting factors only to the interpolators for pixels which are to be weighted with a weighting factor not equal to zero.

Starting with the interpolation pixel 300 circled in FIG. 16, the position of which is also illustrated in the fields S(n−2), S(n−1), an addressing takes place, i.e., a positioning of the filter masks in the image S(n−2) preceding the intermediate image and in the following image.

Based on the filter weights $W_{(n-2)}(i,j)$ dependent on the interpolation phase for the pixels 300 of the previous image S(n−1), and on the filter weights $W_{(n-1)}(i,j)$ for the pixels 300 of the following image S(n−2), as well as on the filter weights for the pixels $W_z(i,j)$ 302, 304 of the intermediate image, which determine the recursive component, the starting value of the weighted median filter is determined by the expression:

$$S(x, y, T_z) = Med \begin{pmatrix} W_{[N-2]} & \diamond & S(x - p_{left} \cdot v_x, y - p_{left} \cdot v_y, T_{[N-2]}) \\ W_{[N-1]} & \diamond & S(x + p_{right} \cdot v_x, y + p_{right} \cdot v_y, T_{[N-1]}) \\ W_z & \diamond & S(x-1, y, T_z) \end{pmatrix} \quad (12)$$

In the event the filter positions here starting from the interpolation pixel (x,y) projected into the previous image S(n−2) and the following image S(n−1) do not precisely coincide with a pixel position, the associated pixels are determined, as shown in FIG. 16, by a bilinear interpolation according to the expression:

$$S(x+dx, y+dy) = dx \cdot dy \cdot S(x+1, y+1) + (1-dx) \cdot dy \cdot S(x, y+1) + dx \cdot (1-dy) \cdot S(x+1, y) + (1-dx) \cdot (1-dy) \cdot S(x, y) \quad (13)$$

To generate a progressive starting image, all image lines (0, 1, 2, 3, . . . , 2R−1) are processed from the intermediate image S(Z) according to FIG. 16 and Equation 13. If an interlaced starting image is to be generated, only the uneven (1, 3, . . . , 2R−1) or even (0, 2, . . . , 2R−2) image lines of the intermediate image S(Z) are processed, depending on the raster position of the intermediate image to be interpolated.

Interpolation in the highs channel may be implemented as follows. Starting with the interpolation pixel, an addressing of the filter masks similarly takes place in the highs channel in the image S(n−2) or S(n−1) preceding or following the intermediate image. To avoid any loss of resolution in the vertical axis, there is, however, no bilinear interpolation if the vectors do not precisely coincide with a pixel position. Instead, a different treatment is performed in the horizontal axis and vertical axis.

Figure 18:
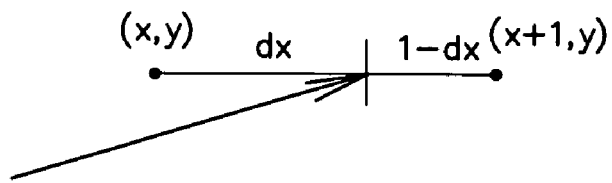
FIG. 18 illustrates a linear horizontal interpolation in the highs channel with band separation of the first video signal into a highs channel and a lows channel.

In the horizontal axis, a simple linear interpolation is implemented as in FIG. 18 according to the equation:

$$S(x+dx, y) = dx \cdot S(x+1, y) + (1-dx) \cdot S(x, y) \quad (14)$$

In the vertical axis, the addressing positions of the filters are rounded up in the previous and following image to frame-line precision. If the rounded-up addressing position lies on a line which is not contained in the field, then the pixels lying above it or below it (if required, horizontally interpolated) are supplied to the median filter. If the rounded addressing position lies, however, on a line which is contained in the field, then the corresponding (if required, horizontally interpolated) pixel is introduced twice into the median filter.

These two possible cases are illustrated in FIG. 19. Only the value from the central filter weight $W_{0,0}$ is considered in this example.

Figure 19B:
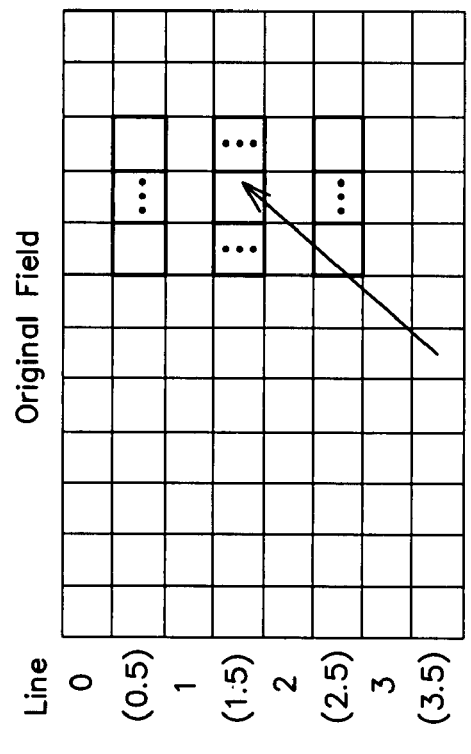
FIG. 19 illustrates an interpolation in the highs channel with band separation of the first video signal into a highs channel and lows channel.
Figure 19A:
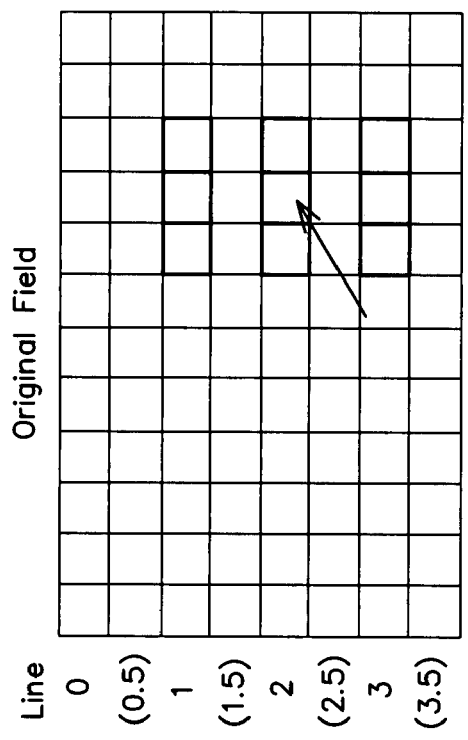
Figure 20:
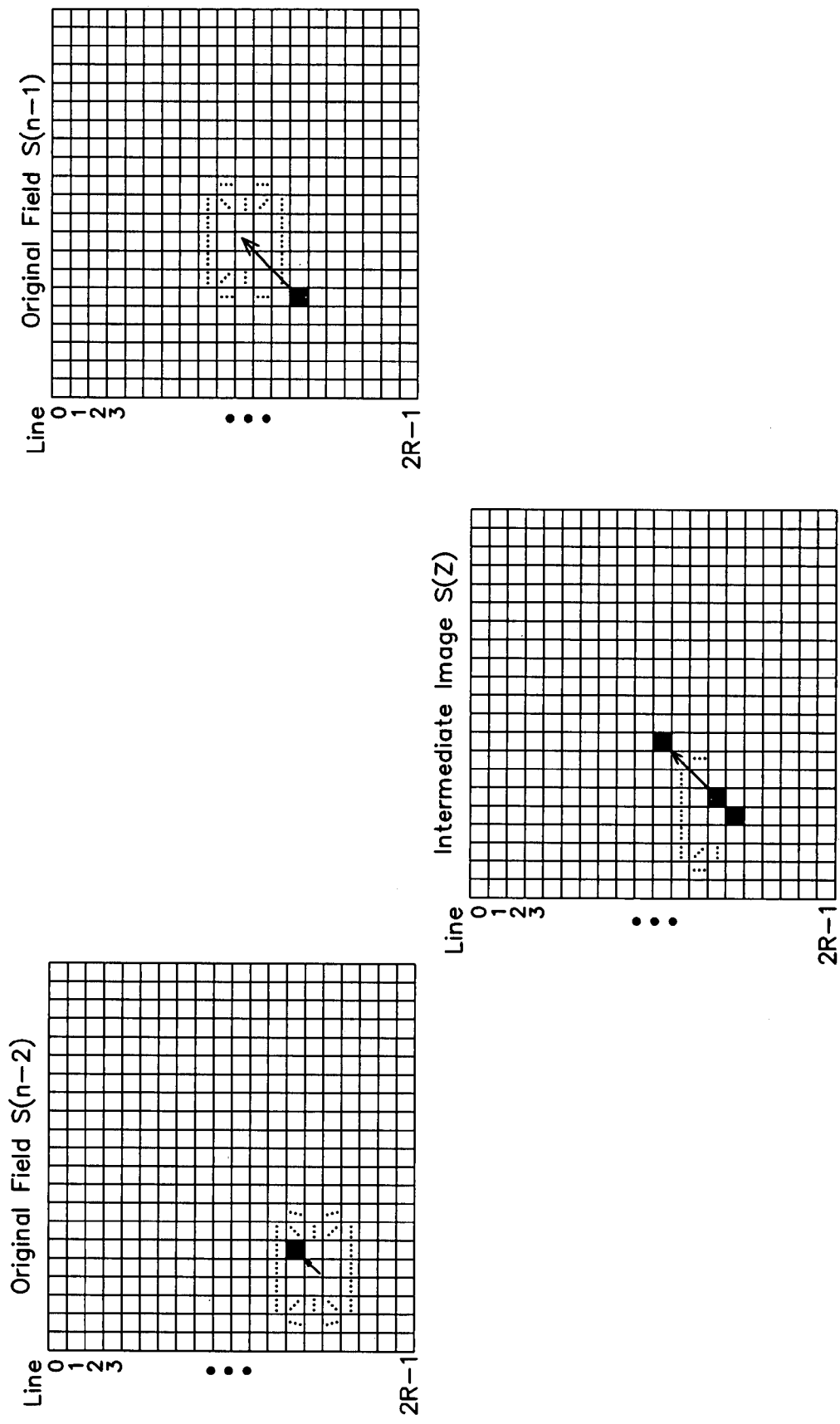
FIG. 20 illustrates an interpolation for a progressive input image sequence.

In the case illustrated in FIG. 19a in which the addressing of the central weight refers to point S(x, 2), and thus to a line contained in the field, the luminance value at position (x, 2) would be supplied to the filter twice.

$$S(x, y, T_z) = Med(\ldots, 2 \cdot W_{[N-2]}(0,0) \diamond S(x, 2, T_{[N-2]}), \ldots) \quad (15)$$

In the case b) shown in FIG. 19b, on the other hand, the addressing of the central weight refers to point S(x, 1.5), and thus to a non-existent intermediate line. The expression supplied to the filter is thus $$S(x, y, T_z) = Med(\ldots, W_{[N-2]}(0,0) \diamond S(x, 1, T_{[N-2]}), W_{[N-2]}(0,0) \diamond S(x, 2, T_{[N-2]}), \ldots) \quad (16)$$

The filter positions are treated analogously. To obtain an uneven number of filter weights, a non-motion-compensated additional value may be supplied from the image lying further back S(N−3) or from the following image S(N), as illustrated in FIG. 15. Of the two additional images, the image for which the pixels lie in the raster position to be interpolated is accessed.

The interpolation method illustrated may be implemented without band separation as well. In this case, preferably the whole image is processed utilizing the signal processing methods for the lows channel explained above.

In the case of a progressive input image format, either a two-dimensional band separation may be performed, or a band separation is performed and the signal processing methods of the lows channel is utilized for the whole image.

Since there is no difference in processing for the vertical axis in the highs and lows channel, due to the lack of interlacing, the same interpolation scheme shown in the figure may be employed for both channels. The mask weights do differ, however, and are adapted to the perception properties in the particular channel. All band separations may be implemented either as linear or nonlinear band separations. In the case of a nonlinear band separation, the concepts "highs band/highs channel" and "lows band/lows channel" are to be understood analogously since there is then no separation in the spatial frequency band.

The method according to the invention is based on the use of vector-based weighted median filters in which, in contrast to previous methods, adaptive switching of interpolation filters is provided as a function of the particular interpolation phase and/or of the particular local image information or local vector field properties. As a result, the method may also be adapted to different image rate conditions. The benefit of the interpolation method according to the invention compared to existing interpolation methods is especially great when the number of interpolated images is high relative to the number of images which may be taken over directly or raster-re-interpolated from the input sequence. This is the case, for example, for conversion from 50 Hz to 60 Hz, and for implementation of synthetic slow motion.

Although the present invention has been illustrated and described with respect to several preferred embodiments thereof, various changes, omissions and additions to the form and detail thereof, may be made therein, without departing from the spirit and scope of the invention.

What is claimed is:

1. A method for motion-vector-based conversion of a first video signal having a first image sequence at a first frequency to a second video signal having a second image sequence at a second frequency, the method comprising the steps of:

interpolating at least one intermediate image that is part of the second image sequence, where the interpolated intermediate image lies temporally between first and second images in the first image sequence, where the at least one intermediate image lies at a first temporal distance from the first image in the first image sequence and lies at a second temporal distance from the second image in the first image sequence, where the first and second temporal distances define an interpolation phase, where for a pixel of the interpolated image in the second image sequence a plurality of pixels at least from each of the first and second images of the first image sequence are median filtered; and adaptively weighting the median filter as a function of a first projection factor that comprises a normalized temporal distance for a period of time between the first image of the first image sequence and the intermediate image and as a function of a second projection factor that comprises a normalized temporal distance for a period of time between the intermediate image and the second image of the first image sequence.

2. The method of claim 1, where the step of adaptively weighting further adaptively weights the median filter as a function of a motion vector assigned to a predetermined at least one pixel.

3. The method of claim 1, the method further comprising the steps of:
generating a first filter mask for each of a plurality of defined interpolation phases by determining the selection and weighting of the plurality of pixels of the first image of the first image sequence;
generating a second filter mask for each of a plurality of defined interpolation phases by determining the selection and weighting of the plurality of pixels of the second image of the first image sequence; and
median filtering using the generated first and second filter masks to generate the at least one intermediate image.

4. The method of claim 3, where each of the first and second filter masks comprise a central pixel that is weighted more strongly than the pixels surrounding the central pixel, where the sum of the weights of the central pixels is greater than the sum of the weights of the remaining pixels surrounding the central pixels.

5. The method of claim 3, where each of the first and second filter masks are such that the larger the number of the pixels processed by the first and the second filter masks from the first image and the second image of the first image sequence the smaller is a corresponding one of the first and second projection factors.

6. The method of claim 5, where the filter masks are such that the majority of the filter weights correspond to the one of the first and the second filter masks assigned to the smallest one of the first and second projection factors.

7. The method of claim 3, where for each defined interpolation phase, more than one first filter mask and more than one second filter mask are provided that each filter certain structured image regions, and where the more than one first and second filter masks are selected as a function of a detection of such image regions.

8. The method of claim 3, where for each defined interpolation phase, more than one first filter mask and more than one second filter mask are provided that each filter in connection with motion vectors of varying reliability, where the more than one first and second filter masks are selected as a function of an estimated reliability of the motion vector.

9. The method of claim 8, further comprising the step of providing pixels of the interpolated intermediate image to the median filter.

10. The method of claim 1, further comprising the step of separating the first video signal into at least two subband signals by one of a linear and a nonlinear band separation.

11. The method of claim 1, where the first video signal comprises an interlaced signal.

12. The method of claim 1, where the first video signal comprises a progressive signal.

13. A device for the motion-vector-based conversion of a first video signal which contains a first image sequence at a first frequency to a second video signal which contains a second image sequence at a second frequency, the device comprising:
means for motion estimation which provides a motion vector;
an interpolation system with a median filter which is designed to generate images of the second image sequence which are phase-shifted relative to images of the first image sequence such that for a pixel of an image from the second image sequence, pixels at least from one first image and one second image of the first image sequence are filtered;
means for providing a projection factor, where the particular projection factor is the temporal distance, normalized for the temporal distance between the first and second image, between the image and the first image, or between the image and the second image; and
a filter mask selection unit coupled to an interpolation system, to which at least the projection factor is supplied as the input signal, and which makes available filter masks dependent on the input signals to the interpolation system.

14. The device of claim 13, comprising a vector projection unit, to which the projection factor and the motion vector are supplied, and which provides a projected motion vector which is supplied to a filter mask selection unit.

15. The device of claim 13, comprising:
means for band separation which provides at least one first band signal and at least one second band signal from the first video signal;
a first interpolation system connected to a first filter mask selection unit, and a second interpolation system connected to a second filter mask selection unit, where the at least one first band signal is supplied to the first interpolation system, and the at least one second band signal is supplied to the second interpolation system; and
a logic circuit, to which an output signal of the first interpolation system and an output signal of the second interpolation system are supplied, and which provides the second video signal from the output signal of the first interpolation system and from the output signal of the second interpolation system.

16. A device for the motion-vector-based conversion of a first video signal which contains a first image sequence at a first frequency to a second video signal which contains a second image sequence at a second frequency, the device comprising:
a motion estimation unit that provides a motion vector;
an interpolation system with a median filter that generates images of the second image sequence that are phase-shifted relative to images of the first image sequence, such that for a pixel of an image from the second image sequence pixels at least from one first image and one second image of the first image sequence are filtered;
means for providing a projection factor, where the particular projection factor is the temporal distance, normalized for the temporal distance between the first and second image, between the image and the first image, or between the image and the second image; and
a filter mask selection unit coupled to an interpolation system, to which at least the projection factor is supplied as the input signal, and which provides filter masks dependent on the input signals to the interpolation system.

* * * * *